US012803023B2

(12) United States Patent
Farnsworth et al.

(10) Patent No.: US 12,803,023 B2
(45) Date of Patent: Nov. 17, 2026

(54) APPARATUS, SYSTEM, AND METHOD FOR CONTROLLING MULTIPLE INTEGRATED FUEL CELL SYSTEMS HAVING A COMMON COOLING SYSTEM

(71) Applicant: Toyota Motor Engineering & Manufacturing North America, Inc., Plano, TX (US)

(72) Inventors: Jared M. Farnsworth, San Francisco, CA (US); Yohei Okamoto, Torrance, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 551 days.

(21) Appl. No.: 18/372,600

(22) Filed: Sep. 25, 2023

(65) Prior Publication Data

US 2025/0105324 A1 Mar. 27, 2025

(51) Int. Cl.

| | |
|---|---|
| ***H01M 8/04*** | (2016.01) |
| ***H01M 8/04029*** | (2016.01) |
| ***H01M 8/0432*** | (2016.01) |
| ***H01M 8/0438*** | (2016.01) |
| ***H01M 8/04664*** | (2016.01) |

(Continued)

(52) U.S. Cl.

CPC ... *H01M 8/04768* (2013.01); *H01M 8/04029* (2013.01); *H01M 8/04358* (2013.01); *H01M 8/04417* (2013.01); *H01M 8/04686* (2013.01); *H01M 8/04723* (2013.01); *H01M 8/24* (2013.01); *H01M 2250/20* (2013.01)

(58) Field of Classification Search

CPC ......... H01M 8/04768; H01M 8/04783; H01M 8/04029; H01M 8/04014; H01M 8/04358; H01M 8/04365; H01M 8/04417; H01M 8/04686; H01M 8/04723; H01M 8/24; H01M 2250/20

See application file for complete search history.

(56) References Cited

U.S. PATENT DOCUMENTS

| | | | |
|---|---|---|---|
| 8,822,093 | B2 | 9/2014 | Kim et al. |
| 10,714,773 | B2 | 7/2020 | Farnsworth et al. |

(Continued)

FOREIGN PATENT DOCUMENTS

| | | | |
|---|---|---|---|
| JP | 2022118947 | A | 8/2022 |

*Primary Examiner* — Raymond Alejandro

(74) *Attorney, Agent, or Firm* — Snell & Wilmer LLP

(57) ABSTRACT

Apparatuses, systems, and methods for cooling two or more fuel cell systems on a vehicle. The system includes at least two fuel cell systems connected to a common cooling system. The system also includes at least two pumping apparatuses connected, respectively, to the at least two fuel cell systems. The system further includes a processor connected to one or more controllers that are connected to the at least two pumping apparatuses. The processor is configured to determine a target flow rate of a fluid to be received by a first fuel cell system of the at least two fuel cell systems, determine a target pump speed of a first pumping apparatus of the at least two pumping apparatuses, and actuate the first pumping apparatus via a first controller of the one or more controllers based on the determined target pump speed of the first pumping apparatus.

19 Claims, 12 Drawing Sheets

(51) Int. Cl.

| | |
|---|---|
| ***H01M 8/04701*** | (2016.01) |
| ***H01M 8/04746*** | (2016.01) |
| ***H01M 8/24*** | (2016.01) |

(56) References Cited

U.S. PATENT DOCUMENTS

| | | | | |
|---|---|---|---|---|
| 10,777,831 | B2 | 9/2020 | Folick et al. | |
| 11,094,950 | B2 | 8/2021 | Folick et al. | |
| 11,201,341 | B2 | 12/2021 | Farhat et al. | |
| 2007/0248861 | A1 | 10/2007 | Hoshi | |
| 2021/0075046 | A1* | 3/2021 | Taneoka | H01M 8/04029 |
| 2023/0044629 | A1* | 2/2023 | Pubrat | B60L 50/72 |
| 2023/0365026 | A1* | 11/2023 | Dunn | H01M 8/04358 |

* cited by examiner

APPARATUS, SYSTEM, AND METHOD FOR CONTROLLING MULTIPLE INTEGRATED FUEL CELL SYSTEMS HAVING A COMMON COOLING SYSTEM

BACKGROUND

Field

The present disclosure relates to apparatuses, systems, and methods for cooling two or more fuel cell systems having a common cooling system on a vehicle.

Description of the Related Art

Recent developments, e.g., in auto industry have introduced various types of engines and motor-generators designed to improve fuel economy and powered by various sources of energy. One such source of energy for, e.g., propelling a vehicle via such an engine and/or a motor-generator is based on a fuel cell technology which generates electricity by facilitating a chemical reaction. However, when the vehicle has multiple (i.e., at least two) fuel cell systems that function independently of one another, e.g., working based on different operating conditions or parameters, the independent operations of the multiple fuel cell systems can result in unsynchronized cooling requirements for these fuel cell systems. Moreover, when the multiple fuel cell systems are utilizing a common cooling system (e.g., including a single radiator), the flow of a fluid (e.g., a cooling fluid) circulating through each of the multiple fuel cell systems can result in various issues including, e.g., a back-flow of the cooling fluid to at least one of the multiple fuel cell systems. Such back-flow of the cooling fluid can result in damage to various components on the vehicle including those of at least the fuel cell system receiving the back-flow of the cooling fluid.

Accordingly, there is a need for apparatuses, systems, and methods for cooling multiple integrated fuel cell systems having a common cooling system on a vehicle.

SUMMARY

Described herein is a system for cooling two or more fuel cell systems on a vehicle. The system may include at least two fuel cell systems. The at least two fuel cell systems may be connected to a common cooling system. Each of the at least two fuel cell systems may include a fuel cell stack. The fuel cell stack may have a plurality of fuel cells. Each of the at least two fuel cell systems may be configured to receive a fluid. The common cooling system may include at least one cooling apparatus. The at least one cooling apparatus may be configured to adjust a temperature of the fluid. The system may also include at least two pumping apparatuses. The at least two pumping apparatuses may be connected, respectively, to the at least two fuel cell systems. Each of the at least two pumping apparatuses may be configured to adjust a flow rate of the fluid to a respective fuel cell system of the at least two fuel cell systems based on a target pump speed. The system may further include a processor. The processor may be connected to one or more controllers. The one or more controllers may be connected to the at least two pumping apparatuses. The processor may be configured to determine a target flow rate of the fluid to be received by a first fuel cell system of the at least two fuel cell systems. The processor may also be configured to determine the target pump speed of a first pumping apparatus of the at least two pumping apparatuses connected to the first fuel cell system based on the determined target flow rate of the fluid to be received by the first fuel cell system. The processor may further be configured to actuate the first pumping apparatus via a first controller of the one or more controllers connected to the first pumping apparatus based on the determined target pump speed of the first pumping apparatus.

Also described is a method for cooling two or more fuel cell systems. The method may include determining, by an electronic control unit (ECU), a target flow rate of a fluid to be received by a first fuel cell system of at least two fuel cell systems on a vehicle. The at least two fuel cell systems may be connected to a common cooling system. The common cooling system may include at least one cooling apparatus. The at least one cooling apparatus may be configured to adjust a temperature of the fluid. The method may also include determining, by the ECU, a target pump speed of a first pumping apparatus of at least two pumping apparatuses connected, respectively, to the at least two fuel cell systems based on the determined target flow rate of the fluid to be received by the first fuel cell system. The method may further include actuating, by the ECU and via a first controller of one or more controllers connected to the first pumping apparatus, the first pumping apparatus based on the determined target pump speed of the first pumping apparatus.

Moreover, also described is a vehicle having a system for cooling two or more fuel cell systems. The vehicle may include at least two fuel cell systems. The at least two fuel cell systems may be connected to a common cooling system. Each of the at least two fuel cell systems may include a fuel cell stack. The fuel cell stack may have a plurality of fuel cells. Each of the at least two fuel cell systems may be configured to receive a fluid. The common cooling system may include at least one cooling apparatus. The at least one cooling apparatus may be configured to adjust a temperature of the fluid. The vehicle may also include at least two pumping apparatuses. The at least two pumping apparatuses may be connected, respectively, to the at least two fuel cell systems. Each of the at least two pumping apparatuses may be configured to adjust a flow rate of the fluid to a respective fuel cell system of the at least two fuel cell systems based on a target pump speed. The vehicle may further include at least two fluid flow control apparatuses. The at least two fluid flow control apparatuses may be connected, respectively, to the at least two fuel cell systems. Each of the at least two fluid flow control apparatuses may be configured to control a flow of the fluid from the respective fuel cell system to the common cooling system. Moreover, the vehicle may include a processor. The processor may be connected to one or more controllers. The one or more controllers may be connected to the at least two pumping apparatuses and the at least two fluid flow control apparatuses. The processor may be configured to determine a target flow rate of the fluid to be received by a first fuel cell system of the at least two fuel cell systems. The processor may also be configured to determine the target pump speed of a first pumping apparatus of the at least two pumping apparatuses connected to the first fuel cell system based on the determined target flow rate of the fluid to be received by the first fuel cell system. The processor may further be configured to determine a target level of opening of a first fluid flow control apparatus of the at least two fluid flow control apparatuses connected to the first fuel cell system. Moreover, the processor may be configured to actuate the first pumping apparatus and the first fluid flow control apparatus via a first controller of the one or more controllers connected to the first pumping apparatus and the first fluid flow control apparatus based on, respectively, the determined target pump speed and the determined target level of opening of the first fluid flow control apparatus.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Described herein are apparatuses, systems, and methods for cooling two or more fuel cell systems (also referred to herein as fuel cell modules or circuitries) having a common cooling system (e.g., a common radiator) on a vehicle, wherein the fuel cell modules may be connected in parallel to the common radiator. The apparatuses, systems, and methods disclosed herein utilize a model-based development approach to facilitate the cooling. The disclosed apparatuses, systems, and methods may utilize a state estimator module or circuitry which may use real-time data (such as, e.g., temperature data, pressure differential data across fluid pumps, and fluid pump speed or flow rate data, etc.) to determine an optimal flow rate (i.e., an optimal pump speed) to pump a fluid (e.g., a cooling fluid) from a given pump of a fuel cell module of the two or more fuel cell modules while accounting for the impact of having the other one(s) of the two or more fuel cell modules connected in parallel with the fuel cell module and the common radiator.

The state estimator module or circuitry may be used to control the pump speed of a fluid pump and/or the states (e.g., part positions) of valves (e.g., three-way valves, rotary valves, or the like) connected to or within the fuel cell modules. For example, the three-way valves may be selectively opened/closed (e.g., fully or partially) to prevent a back-flow of the cooling fluid and to control the cooling operations for the fuel cell modules. Specifically, the state estimator module or circuitry may operate to keep the flow rate of the cooling fluid within a prescribed operating range to prevent a surge event (e.g., including the flow of the cooling fluid oscillating between positive and negative directions uncontrollably) as well as any back-flow of the cooling fluid.

As such, the apparatuses, systems, and methods disclosed herein provide many benefits and advantages including preventing the surge event as well as the back-flow of the cooling fluid which can result in component damage. Moreover, the disclosed apparatuses, systems, and methods can account for system design changes and all operating conditions to support multiple integrated fuel cell systems or modules connected in parallel with a single common cooling system or module (e.g., a single common radiator). The disclosed apparatuses, systems, and methods may utilize a model-based development approach that can be easily adapted to the system design changes and account for all the operating conditions—e.g., having at least one fuel cell system connected to a single radiator in parallel and adding one or more additional fuel cell systems to be connected to the single radiator in parallel.

Figure 1:
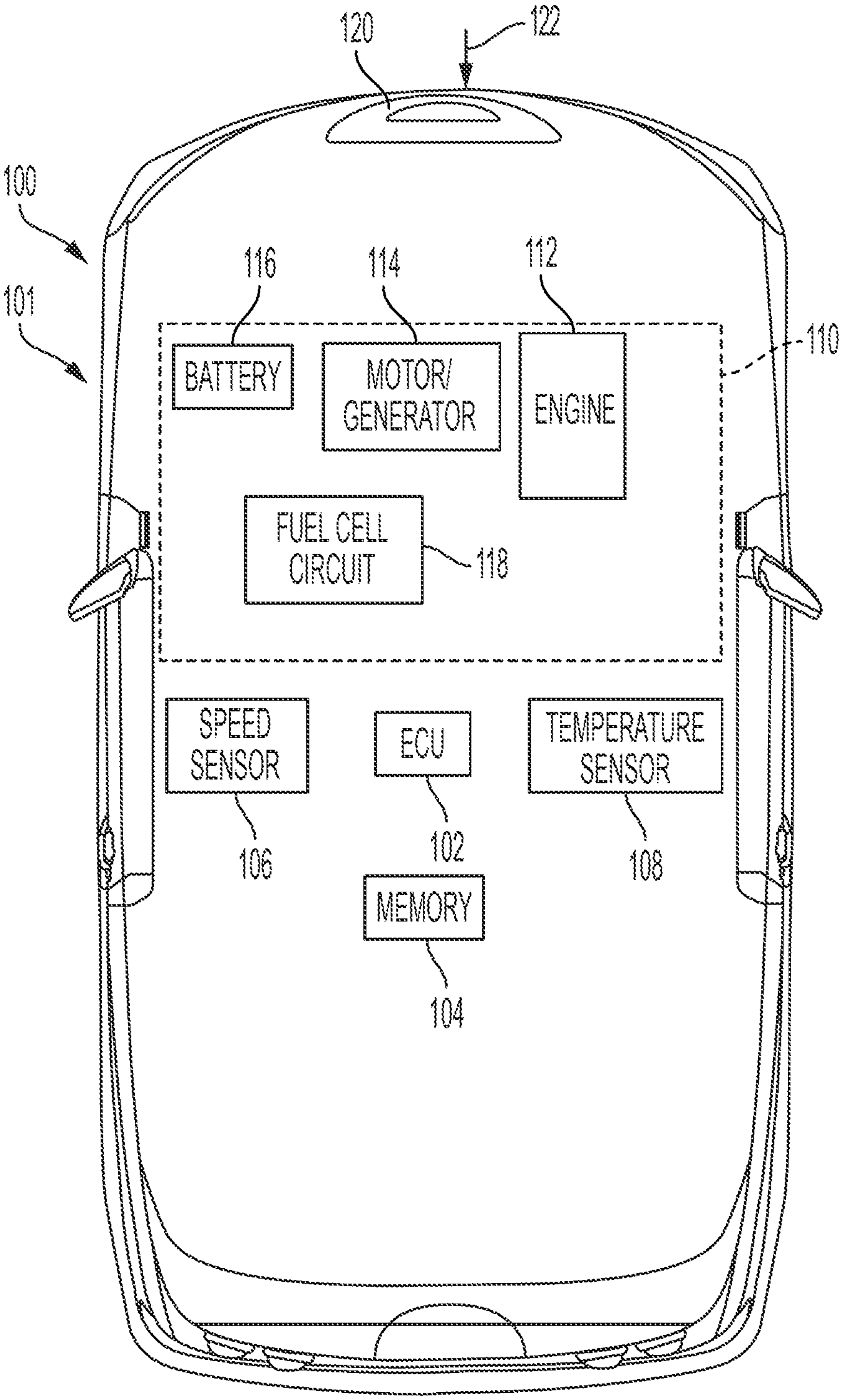
FIG. 1 is a block diagram illustrating various components on or within a vehicle having a system for cooling two or more fuel cell systems on the vehicle according to an embodiment of the present invention.

Turning to FIG. 1, a vehicle 100 having a system 101 for cooling two or more fuel cell systems on the vehicle 100 is disclosed. The vehicle 100 (i.e., including the system 101) may include an electronic control unit (ECU) 102, a memory 104, a speed sensor 106, and a temperature sensor 108. The vehicle 100 may further include a power source 110 which may include at least one of an engine 112 or a motor-generator 114, along with an energy storage device (e.g., a battery) 116 and a fuel cell circuit 118 (also referred to herein as a fuel cell system, module, or circuitry). Each of these components, as well as any other component(s) described herein, may be or include an apparatus, a device, a system, a circuitry, or the like configured to perform the disclosed operation(s).

The ECU 102 may be coupled to each of the components on or within the vehicle 100 and may include one or more processors or controllers, which may be specifically designed for automotive systems. These one or more processors may be implemented as a single processor or as multiple processors. For example, the ECU 102 may be or include a microprocessor, a data processor, a microcontroller, or other controller, and may be electrically coupled to the components on or within the vehicle 100. The ECU 102 may be a dedicated controller configured to control a specific component or may be coupled to or be a part of another controller which controls other devices. The functions of the ECU 102 may be implemented in a single ECU or in multiple ECUs. The ECU 102 may receive data from one or more components on or within the vehicle 100, may make one or more determinations based on the received data, and may control the operation of the one or more components based on the one or more determinations.

In some embodiments, the vehicle 100 may be fully autonomous or semi-autonomous. In that regard, the ECU 102 may control various aspects of the vehicle 100 (such as, e.g., steering, braking, accelerating, or the like) to maneuver the vehicle 100 from a starting location to a destination.

The memory 104 may include any non-transitory memory known in the art. In that regard, the memory 104 may store one or more machine-readable instructions usable by the ECU 102 and may store other data as requested by the ECU 102.

The speed sensor 106 may be any speed sensor capable of detecting data usable to determine a speed of the vehicle 100. For example, the speed sensor 106 may include a global positioning system (GPS) sensor or an inertial measurement unit (IMU) sensor. The speed sensor 106 may also or instead include an angular velocity sensor configured to detect an angular velocity of the wheels on the vehicle 100 or the engine 112, a speedometer, or the like.

The temperature sensor 108 may include one or more temperature sensors capable of detecting data usable to determine an ambient temperature within a portion of the vehicle 100 or outside of the vehicle 100. For example, the temperature sensor 108 may include a thermocouple, a thermometer, an infrared temperature sensor, a thermistor, or the like.

The engine 112 may utilize fuel to provide mechanical power. In that regard, the engine 112 may be a gasoline engine, a diesel engine, or the like.

The energy storage device 116 may store electrical energy. In some embodiments, the energy storage device 116 may include any one or more energy storage devices including a battery, a fly-wheel, a super-capacitor, a thermal storage device, or the like.

The fuel cell circuit 118 may include a fuel cell stack (e.g., having a plurality of fuel cells) that facilitates a chemical reaction to provide electrical energy. In that regard, the electrical energy provided by the fuel cell circuit 118 may be stored in the energy storage device 116. In some embodiments, the vehicle 100 may include multiple (i.e., two or more) fuel cell circuits including the fuel cell circuit 118.

The motor-generator 114 may convert the electrical energy stored in the energy storage device 116 (or the electrical energy received directly from, e.g., the fuel cell circuit 118) into mechanical power usable to propel the vehicle 100. The motor-generator 114 may further convert mechanical power received from the engine 112 or one or more wheels on the vehicle 100 into electricity, which may be stored in the energy storage device 116 as energy and/or used by other components on or within the vehicle 100. In some embodiments, the motor-generator 114 may also or instead include a turbine or other device capable of generating thrust.

Furthermore, the vehicle 100 may also include a grill 120 located on the body of the vehicle 100 (e.g., on the front side of the vehicle 100). The grill 120 may receive an air flow 122. The speed of the air flow 122 may directly correspond to the speed of the vehicle 100. For example, if a headwind of 5 miles per hour (mph) exists outside of the vehicle 100, and the vehicle 100 is traveling at 50 mph, then the speed of the air flow 122 may be approximately 55 mph.

Figure 2A:
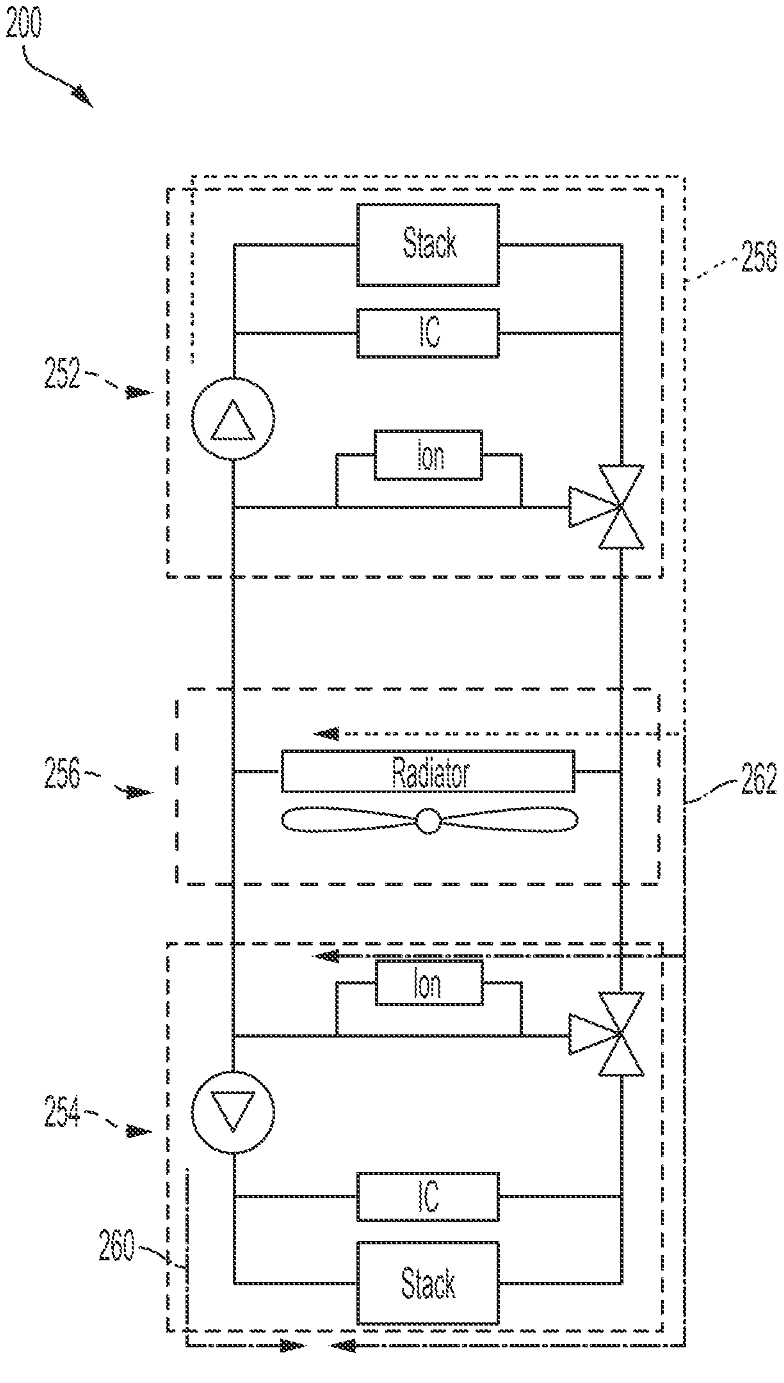
FIG. 2A is a schematic illustrating a system for cooling two or more fuel cell systems on a vehicle according to an embodiment of the present invention.

FIG. 2A is a schematic illustrating a system 200 for cooling two or more fuel cell systems on a vehicle (e.g., similar to the vehicle 100 shown in and described herein with respect to FIG. 1). As shown, the system 200 may include a first fuel cell system 252, a second fuel cell system 254, and a common cooling system 256. The common cooling system 256 may be connected in parallel with the first fuel cell system 252 and the second fuel cell system 254. The first fuel cell system 252 may provide a first flow 258 of a fluid (which may be gas or liquid; also referred to herein as a cooling fluid), and the second fuel cell system 254 may provide a second flow 260 of the fluid. The apparatuses, systems, and methods described herein with respect to, e.g., the system 200 may prevent a surge event as well as a back-flow 262 of the fluid which may result when the first fuel cell system 252 and/or the second fuel cell system 254 are not working in a prescribed range of operating conditions. While only two fuel cell systems (i.e., the first fuel cell system 252 and the second fuel cell system 254) are shown, it would be apparent to one of ordinary skill in the art that the number of the fuel cell systems connected in parallel may vary, and the disclosed apparatuses, systems, and methods can operate to account for the impact of the multiple fuel cell systems connected in parallel while, in some cases involving sufficiently different operating conditions amongst the multiple fuel cell systems (in, e.g., fluid velocity, fluid flow rate, or the like), operating also to prevent the surge event as well as the back-flow 262 of the fluid to one or more of the multiple fuel cell systems.

Figure 2B:
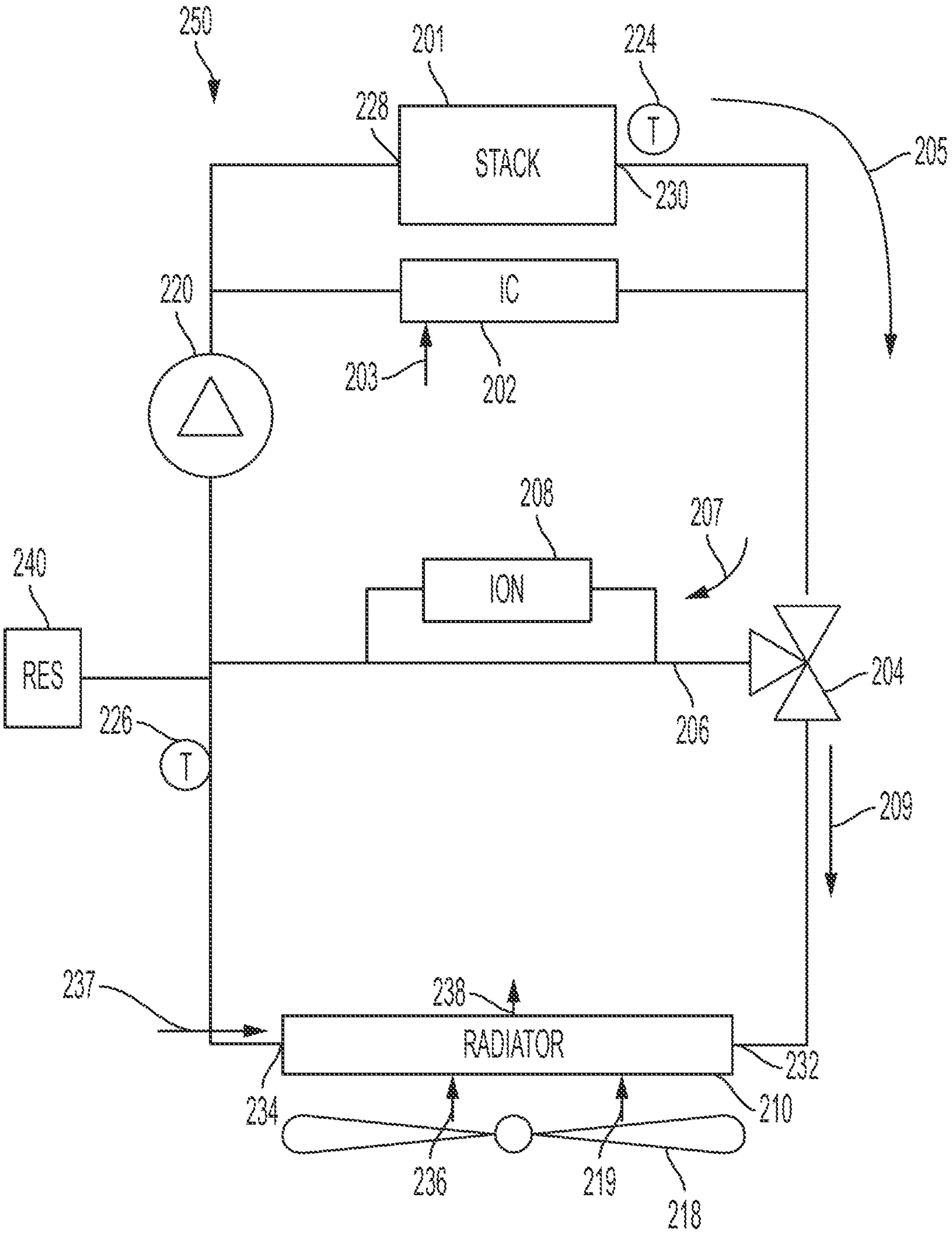
FIG. 2B is a schematic illustrating a portion of a system for cooling two or more fuel cell systems on a vehicle according to an embodiment of the present invention.

FIG. 2B is a schematic illustrating a portion of the system 200 for cooling two or more fuel cell systems on a vehicle. Specifically, the first fuel cell system 252 and/or the second fuel cell system 254 shown in and described herein with respect to FIG. 2A may be or include a fuel cell system 250 shown in FIG. 2B.

The fuel cell system 250 shown in FIG. 2B may include a fuel cell stack 201 having a plurality of fuel cells. The fuel cells may each facilitate a chemical reaction to generate electricity. The chemical reaction may generate heat. Furthermore, a fluid (e.g., a cooling fluid) may flow through the fuel cell stack 201 and may transfer at least some of the heat away from the fuel cell stack 201 (increasing the temperature of the fluid as the fluid exits the fuel cell stack 201). In that regard, the fuel cell stack 201 may include an inlet 228 for receiving the fluid and an outlet 230 through which the fluid exits the fuel cell stack 201.

It may be desirable for the fuel cell stack 201 to operate within a predetermined temperature range to, e.g., prevent any damage to any part of the fuel cell stack 201 (e.g., from overheating or drying out). For example, it may be desirable for the fuel cells of the fuel cell stack 201 to operate between 50 degrees Celsius (° C.) (which is equivalent to 122 degrees Fahrenheit (° F.)) and 80° C. (which is equivalent to 176° F.).

The fuel cell stack 201 may generate more electrical energy at higher temperatures than lower temperatures (e.g., at closer to 80° C. than 50° C.). However, the fuel cell stack 201 may lose moisture (i.e., may dry out) when operated at these relatively high temperatures. In that regard, it may be desirable for the fuel cell stack 201 to operate at closer to but lower than 80° C. when a relatively large amount of power (i.e., more than a first predetermined threshold amount) is requested, and at closer to but higher than 50° C. when a relatively small amount of power (i.e., less than a second predetermined threshold amount which may be less than the first predetermined threshold amount) is requested. One or more of these threshold amounts may be predetermined (e.g., provided by a server connected to the fuel cell system 250 or the like) or determined based on one or more parameters such as, e.g., a desired electrochemical performance, a desired water balance, etc. The fuel cell system 250 may include various features for increasing or decreasing the temperature of the fuel cell stack 201.

The fuel cell system 250 may include an intercooler 202. The intercooler 202 may be oriented in parallel with the fuel cell stack 201. The intercooler 202 may receive a hot air flow 203 (e.g., an air flow having a greater temperature than the temperature of the fluid within the intercooler 202) and may transfer the heat from the hot air flow 203 to the fluid. Accordingly, in some embodiments, the fuel cell stack 201 and the intercooler 202 may be considered heating elements of the fuel cell system 250 as they both increase the temperature of the fluid. All of the fluid within the fuel cell system 250 may eventually flow through the combination of the fuel cell stack 201 and the intercooler 202 as shown by an arrow 205.

The fuel cell system 250 may include a fluid flow control apparatus (also referred to herein as a valve, a three-way valve, or a rotary valve) 204. The valve 204 may be, e.g., a three-way valve, a rotary valve, or the like configured to control a flow (e.g., a flow rate or direction) of the fluid received at an inlet of the valve 204. The fuel cell system 250 may also include one or more radiators 210 along with a bypass branch 206 (e.g., a bypass pipe) that bypasses the one or more radiators 210. The valve 204 may divide the flow of the fluid received at the inlet of the valve 204 between the one or more radiators 210 and the bypass branch 206 based on a state (e.g., a valve position) of the valve 204. The valve 204 may have multiple valve states (e.g., positions) each dividing the flow between the bypass branch 206 and the one or more radiators 210 at a respective ratio of various ratios.

For example, the valve 204 may have a first position at which 80 percent (%) of the fluid flows through the bypass branch 206 (as shown by an arrow 207) and 20% of the fluid flows through the one or more radiators 210 (as shown by an arrow 209). The valve 204 may further have a second position at which 70% of the fluid flows through the bypass branch 206 and 30% of the fluid flows through the one or more radiators 210. The valve 204 may have one or more discrete valve positions or may have an infinite number of continuous valve positions (i.e., may direct any value between 0% and 100% of the fluid through the bypass branch 206 and/or the one or more radiators 210).

The fluid that flows through the bypass branch 206 may avoid the one or more radiators 210, thus allowing a majority of heat within the fluid to remain in the fluid. An ionizer 208 may receive some of the fluid that flows through the bypass branch 206. The ionizer 208 may function as an ion exchanger and may remove ions from the fluid to reduce conductivity. In that regard, the ionizer 208 may be referred to as a de-ionizer.

The one or more radiators 210 may transfer heat away from the fluid to a gas (such as air) flowing over or past the one or more radiators 210. In that regard, the one or more radiators 210 may be referred to as cooling elements of the fuel cell system 250.

In some embodiments, the one or more radiators 210 may include a main radiator and one or more secondary radiators. It would be apparent to one of ordinary skill in the art that the number of main or secondary radiators may vary.

The fuel cell system 250 may include a fan 218. The fan 218 may be oriented in such a manner as to direct a flow of gas 219 over the one or more radiators 210. In some embodiments, the fan 218 may direct the flow of gas 219 only over one of the one or more radiators 210 (e.g., a main radiator). The one or more radiators 210 may have a fluid inlet 232 by which the fluid flows into the one or more radiators 210 and a fluid outlet 234 by which the fluid flows out of the one or more radiators 210. The one or more radiators 210 may include an air inlet 236 that receives the flow of gas 219 (i.e., an air flow) from the fan 218 as well as an air outlet 238 by which the flow of gas 219 exits the one or more radiators 210.

One or more of the one or more radiators 210 may receive an air flow 237 (which may be similar to the air flow 122 received via the grill 120 on the vehicle 100 shown in and described herein with respect to FIG. 1). As similarly described herein, the velocity of the air flow 237 may correspond to a vehicle speed. That is, as the vehicle speed increases, the velocity of the air flow 237 may increase, increasing the rate or volume of the transfer of heat away from the fluid by the air flow 237.

The fuel cell system 250 may include a pumping apparatus 220 (also referred to herein as a pump). The pumping apparatus 220 may include any pump capable of forcing the fluid through the fuel cell system 250. For example, the pumping apparatus 220 may include a hydraulic pump, a diaphragm pump, a piston pump, a rotary gear pump, or the like.

The fuel cell system 250 may include a reservoir 240. The reservoir 240 may include a cavity having a volume in which the fluid, e.g., a cooling fluid such as a coolant, may be stored. The fluid may be provided to the fuel cell system 250 from the reservoir 240. In some embodiments, the reservoir 240 may include a port through which a vehicle user may provide the fluid to the reservoir 240.

The fuel cell system 250 may include one or more temperature sensors—for example, in some embodiments, including a first temperature sensor 224 and a second temperature sensor 226. The first temperature sensor 224 may detect the temperature of the fluid exiting the fuel cell stack 201 at the outlet 230. The second temperature sensor 226 may detect the temperature of the fluid exiting the one or more radiators 210 at the fluid outlet 234. In some embodiments, a greater number (e.g., for a higher accuracy in the estimated or calculated values described herein) or a smaller number (e.g., for a reduced cost) of temperature sensors may be used, and one or more temperature sensors may be positioned at additional or alternative locations.

As described herein, it may be desirable for the temperature of the fuel cell stack 201 to increase when a relatively large amount of power is requested from the fuel cell stack 201. This is because the increased temperature corresponds to an increased power output of the fuel cell stack 201. Similarly, it may be desirable for the temperature of the fuel cell stack 201 to decrease when a relatively small amount of power is requested from the fuel cell stack 201 in order to retain moisture in the fuel cell stack 201. In some embodiments, a target temperature of the fuel cell stack 201 may be determined by a processor (e.g., the ECU 102 shown in and described herein with respect to FIG. 1) based on a power request received for a vehicle.

The ECU 102 described herein may also receive the detected temperature(s) from the first temperature sensor 224 and/or the second temperature sensor 226, and may then control one or more actuators (e.g., the valve 204, the fan 218, and/or the pumping apparatus 220) to cause the temperature of the fuel cell stack 201 to increase or decrease (e.g., as evidenced by the temperature of the fluid exiting the fuel cell stack 201 at the outlet 230 relative to the temperature of the fluid entering the fuel cell stack 201 at the inlet 228). The ECU 102 may cause the temperature of the fuel cell stack 201 to increase or decrease towards the target temperature (i.e., based on the detected temperature(s) and the target temperature).

The valve 204 may be used to adjust the temperature of the fluid by directing more of the fluid through the bypass branch 206 or through the one or more radiators 210. For example, if the valve 204 increases the flow of the fluid through the bypass branch 206 by adjusting the state or position of the valve 204 accordingly, then the overall temperature of the fluid may increase because the fluid is directed back towards the heating elements without significant loss of heat. Similarly, if the valve 204 increases the flow of the fluid through the one or more radiators 210 by adjusting the state or position of the valve 204 accordingly, then the overall temperature of the fluid may decrease because more fluid is directed through the one or more radiators 210 where a specific amount of thermal energy may be removed from the fluid by the one or more radiators 210.

The fan 218 may likewise be used to adjust the temperature of the fluid by increasing or decreasing the flow of gas 219 over the one or more radiators 210. For example, if the speed of the fan 218 is increased (resulting in a greater quantity of the flow of gas 219 over the one or more radiators 210), then the temperature of the fluid may decrease as an increased amount (e.g., more than a specific amount) of thermal energy is transferred out of the fluid. Similarly, if the speed of the fan 218 is decreased, then the temperature of the fluid may increase as a decreased (e.g., less than a specific amount) of thermal energy is transferred out of the fluid.

The pumping apparatus 220 may also be used to adjust the temperature of the fluid by increasing or decreasing a flow rate, such as a mass flow rate, of the fluid through the fuel cell system 250 by adjusting the pump speed of the pumping apparatus 220 accordingly. As the flow rate increases, a heat transfer between the fluid and various components increases, which may result in an increase or a decrease in the temperature of the fluid based on how much of the fluid flows through the bypass branch 206 or the one or more radiators 210 and based on the temperature of the fuel cell stack 201. In that regard, the temperature of the fluid may correspond to the flow rate of the fluid.

Figure 2C:
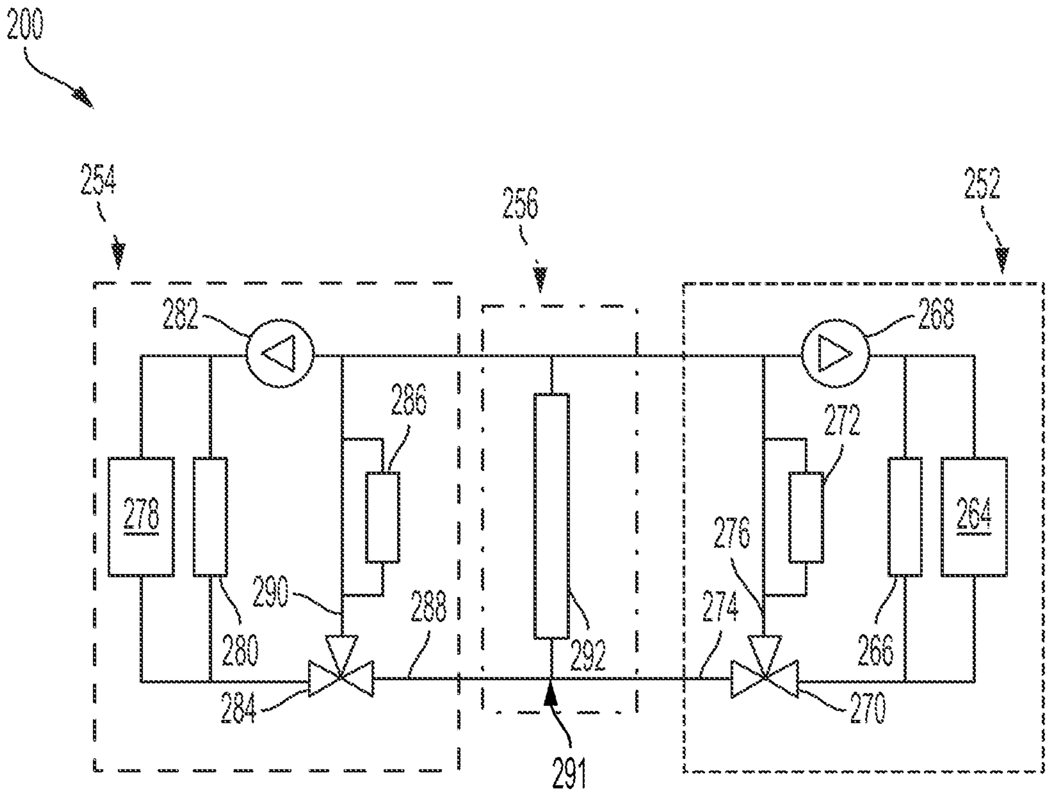
FIG. 2C is a schematic illustrating a system for cooling two or more fuel cell systems on a vehicle according to an embodiment of the present invention.

FIG. 2C is a schematic illustrating the system 200 for cooling two or more fuel cell systems on a vehicle. As shown, the system 200 may include the first fuel cell system 252, the second fuel cell system 254, and the common cooling system 256 connected in parallel with the first fuel cell system 252 and the second fuel cell system 254 (similarly as also shown in FIG. 2A). The first fuel cell system 252 may include a first fuel cell stack 264, a first intercooler 266, a first pump 268, a first valve 270, and a first ionizer 272. The second fuel cell system 254 may include a second fuel cell stack 278, a second intercooler 280, a second pump 282, a second valve 284, and a second ionizer 286. The first fuel cell system 252 and the second fuel cell system 254 may each be similar to the fuel cell system 250 shown in and described herein with respect to FIG. 2B. That is, the first fuel cell stack 264 and the second fuel cell stack 278 may each correspond to the fuel cell stack 201, the first intercooler 266 and the second intercooler 280 may each correspond to the intercooler 202, the first pump 268 and the second pump 282 may each correspond to the pumping apparatus 220, the first valve 270 and the second valve 284 may each correspond to the valve 204, and the first ionizer 272 and the second ionizer 286 may each correspond to the ionizer 208, respectively, shown in and described herein with respect to FIG. 2B. The first valve 270 and the second valve 284 may divide the flow of the fluid, respectively, between a first radiator branch 274 and a first bypass branch 276 and between a second radiator branch 288 and a second bypass branch 290. The first radiator branch 274 and the second radiator branch 288 may each correspond to the arrow 209 indicating the flow of the fluid towards and through the one or more radiators 210 shown in and described herein with respect to FIG. 2B. The first bypass branch 276 and the second bypass branch 290 may each correspond to the bypass branch 206 shown in and described herein with respect to FIG. 2B. As shown, the first radiator branch 274 and the second radiator branch 288 may lead the fluid from, respectively, the first valve 270 and the second valve 284 to reach an intersection 291 (i.e., a common radiator interface) and then towards a radiator 292 of the common cooling system 256. Similar to the one or more radiators 210 shown in and described herein with respect to FIG. 2B, the radiator 292 may be or include one or more radiators configured to cool the fluid passing through the common cooling system 256. As described herein with respect to FIG. 2A for example, the apparatuses, systems, and methods described herein may operate to account for the impact of the multiple fuel cell systems while, in some cases, operating also to prevent the surge event as well as the back-flow of the fluid to the first fuel cell system 252 or the second fuel cell system 254 by, e.g., controlling the pump speed of, respectively, the first pump 268 or the second pump 282. A target pump speed may be predictable for a given target flow rate when there is only a single fuel cell system connected with a cooling system without any other outside factor (i.e., any additional fuel cell system connected in parallel) having a meaningful impact on the pressure differential of the fluid across the pump, and the target flow rate for the single fuel cell system connected with the cooling system may be controlled by the control of the pump speed of the pump accordingly. However, when there is any added fuel cell system connected to the cooling system (such as in the system 200 shown in and described herein with respect to FIG. 2C), the added fuel cell system may change the operation of the pump of the first fuel cell system due to a potentially modified pressure differential across the pump of the first fuel cell system (e.g., based on the fluid being led towards the cooling system from the added fuel cell system). Thus, the apparatuses, systems, and methods described herein account for the modified pressure differential across a given pump (e.g., of the first fuel cell system 252) to determine an appropriate pump speed of the given pump such that the impact of the added fuel cell system is accounted for and, in some cases, any back-flow of the fluid towards the first fuel cell system 252 may be prevented.

Figure 3A:
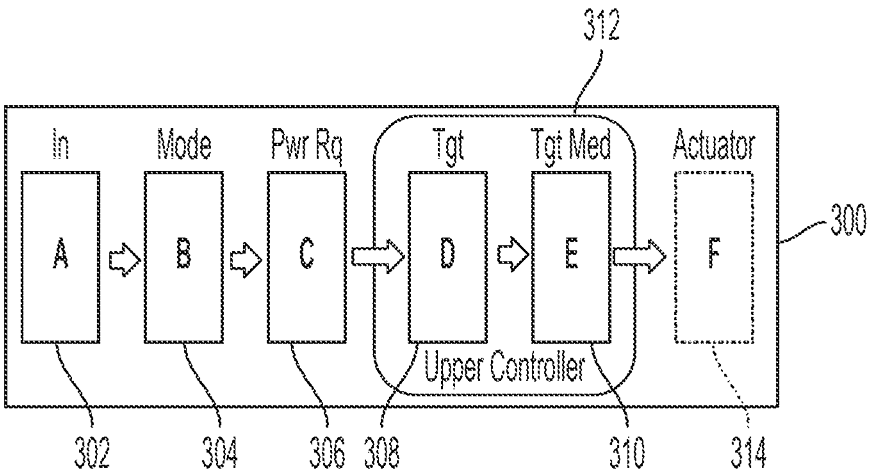
FIG. 3A is a block diagram illustrating a system for cooling two or more fuel cell systems on a vehicle according to an embodiment of the present invention.
Figure 3B:
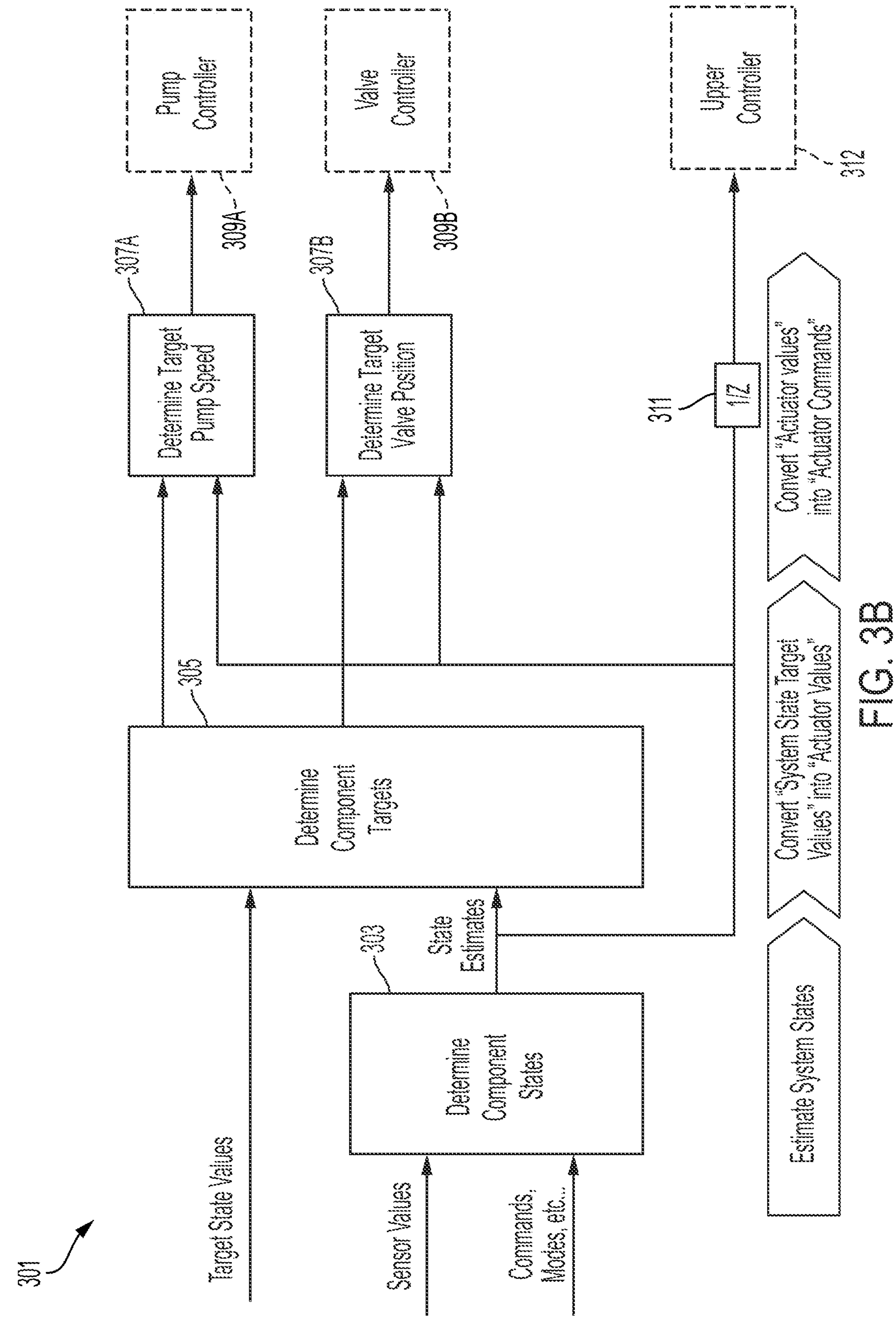
FIG. 3B is a block diagram illustrating a system for cooling two or more fuel cell systems on a vehicle according to an embodiment of the present invention.

Referring now to FIGS. 3A and 3B, a system 300 that controls one or more actuators (e.g., for the first pump 268, the second pump 282, the first valve 270, and/or the second valve 284 shown in and described herein with respect to FIG. 2C) connected, respectively, to two or more fuel cell systems (e.g., at least the first fuel cell system 252 and the second fuel cell system 254 shown in and described herein with respect to FIG. 2C) to account for the multiple fuel cell systems and, in some cases, to prevent the back-flow of a fluid (e.g., a cooling fluid) to the first fuel cell system 252 or the second fuel cell system 254 is described. The system 300 may be implemented using, at least in part, specifically designated hardware of the ECU 102 or general hardware of the ECU 102. In some embodiments, the system 300 may be implemented using one or more separate ECUs connected to the ECU 102 and specifically configured to control, e.g., a fuel cell system connected to a cooling system. That is, the system 300 may be implemented as part of the ECU 102 or as part of one or more separate ECUs connected to the ECU 102.

FIGS. 3A and 3B are block diagrams illustrating, respectively, the system 300 and a control system 301 for cooling two or more fuel cell systems on a vehicle. As shown in FIG. 3A, the system 300 may include an input receiving process 302, a mode determination process 304, a power request process 306, an upper controller process 312, and an actuator control process 314. The upper controller process 312 may include a target setting process 308 and a target mediating process 310. Each of the processes shown in and described herein with respect to FIG. 3A (i.e., the input receiving process 302, the mode determination process 304, the power request process 306, the upper controller process 312, the actuator control process 314, etc.) may each be implemented as an apparatus, a device, a module (e.g., hardware or software), and/or a circuitry configured to perform the disclosed function(s). In some embodiments, one or more (including all) of these processes may be part of one or more combined apparatuses, devices, modules, and/or circuitries configured to perform all or various combinations of the disclosed function(s).

The system 300 may receive an input (e.g., from a user or a vehicle component) corresponding to a predetermined amount of load (as part of the input receiving process 302). The system 300 may then determine a current mode, e.g., of a vehicle (as part of the mode determination process 304). In some embodiments, the system 300 may determine a current mode of one or more fuel cell systems (e.g., of one or more valves of the corresponding one or more fuel cell systems). Then, the system 300 may generate or process a power request (as part of the power request process 306) indicating a required or target level or amount of power to be requested from, e.g., the system 200 having the first fuel cell system 252 and the second fuel cell system 254 shown in and described herein with respect to FIG. 2C based on the received input and the determined mode of the vehicle. The system 300 may then utilize the upper controller process 312 to determine, e.g., a target temperature for a fuel cell stack (e.g., the first fuel cell stack 264 shown in and described herein with respect to FIG. 2C) based on the power request. The system 300 may utilize the target setting process 308 (and the target mediating process 310 as needed—e.g., to determine that a target pump speed or a corresponding target temperature of a fuel cell stack is within a predetermined operation range) to identify the target pump speed corresponding to the target temperature of the fuel cell stack based on the power request. For example, if the power request is for a relatively large amount of power, then the system 300 may set a target temperature to be relatively high (i.e., higher than a predetermined threshold), such as 75° C. (167° F.). Likewise, if the power request is for a relatively small amount of power, then the system 300 may set a target temperature to be relatively low (i.e., lower than a predetermined threshold), such as 55° C. (131° F.). The system 300 may then output a control signal corresponding to, e.g., the target pump speed to control the one or more actuators described herein based on the control signal (as part of the actuator control process 314).

The target mediating process 310 may receive unfiltered target value(s) (e.g., via an electrical signal) and filter the received signal corresponding to the unfiltered value(s) and output a filtered value. The filtering may function as a bandpass filter to ensure that, e.g., the target fuel cell temperature is within a safe temperature range, or the like. The safe temperature range may correspond to a temperature range at which the temperature of a fuel cell stack is unlikely to damage one or more components within a fuel cell circuit (i.e., such as by overheating or drying out) and at which the fuel cell circuit is capable of generating power.

Turning now to FIG. 3B, the control system 301 is described. The control system 301 may include a state estimator process 303, a state governor process 305, target command determination processes 307A and 307B, and part controller processes 309A and 309B. Each of the processes shown in and described herein with respect to FIG. 3B may each be implemented as an apparatus, a device, a module (e.g., hardware or software), and/or a circuitry configured to perform the disclosed function(s). In some embodiments, one or more (including all) of these processes may be part of one or more combined apparatuses, devices, modules, and/or circuitries configured to perform all or various combinations of the disclosed function(s).

The state estimator process 303 may receive inputs indicative of one or more sensor values and one or more current actuator states or positions (or one or more commanded actuator states or positions) and may estimate one or more conditions at various locations of two or more fuel cell systems. The sensor values may include, for example, temperatures detected from the first temperature sensor 224 and the second temperature sensor 226 shown in and described herein with respect to FIG. 2B. The actuator states or positions may be received from the actuators themselves (e.g., the pump, the three-way valve, and the like) or from an actuator control signal.

The fuel cell circuits may include a relatively small number of sensors. Additional data may be desirable in order to provide optimal control of the actuators. In that regard, the state estimator process 303 may calculate or predict the additional data (i.e., current conditions) based on the sensor values and the actuator positions. For example, the state estimator process 303 may calculate or predict temperatures at locations of the fuel cell circuits in which temperature sensors are not present. As another example, the state estimator process 303 may calculate or predict the pressure of the fluid at various locations of the fuel cell circuits. As yet another example, the state estimator process 303 may further calculate or predict quantities of heat added to or subtracted from the fluid by the various elements of the fuel cell circuits. The state estimator process 303 may output calculated or predicted values corresponding to the current conditions of the fuel cell circuits.

Figure 4A:
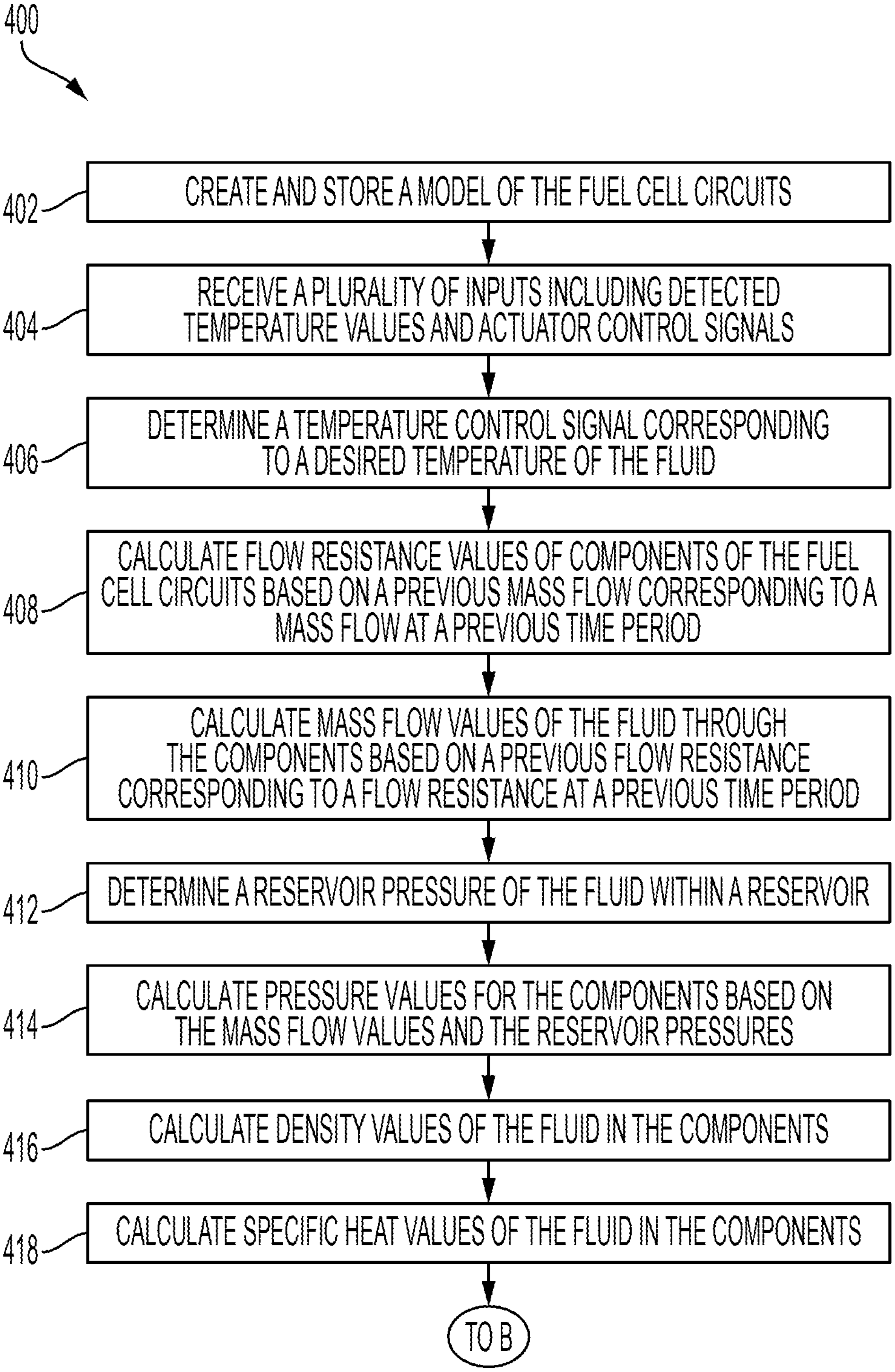
FIGS. 4A and 4B are flowcharts illustrating a method for estimating one or more parameters usable to control one or more actuators of a fuel cell system of two or more fuel cell systems on a vehicle according to an embodiment of the present invention.
Figure 4B:
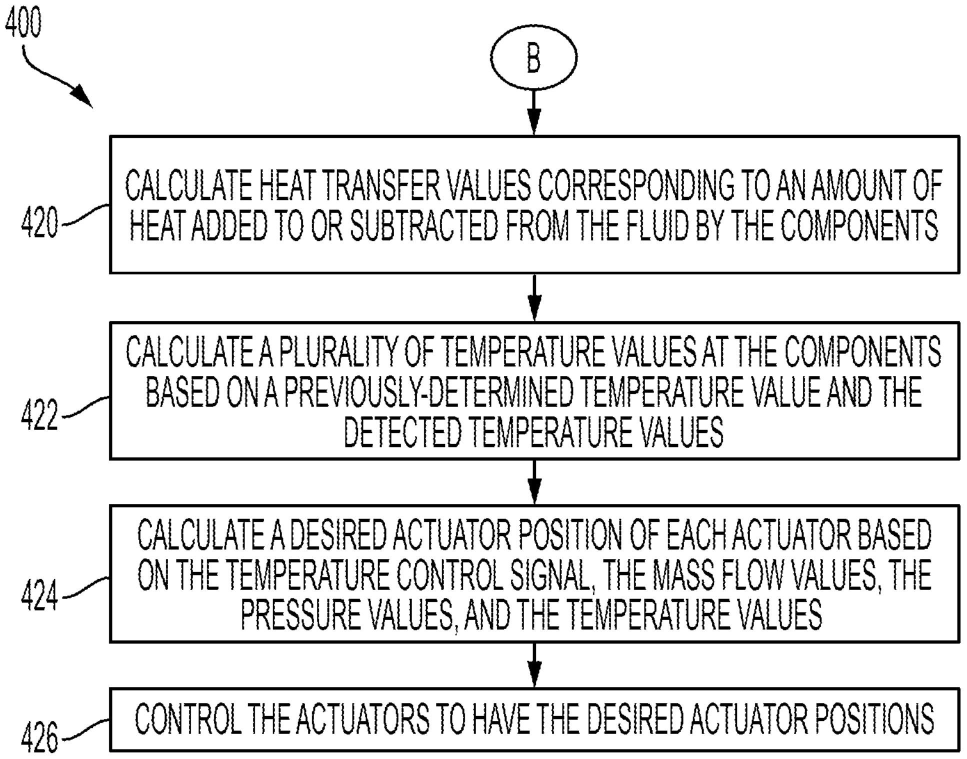

As part of the state estimator process 303 (as well as the state governor process 305, the target command determination processes 307A and 307B, and/or the part controller processes 309A and 309B), the control system 301 may, with reference to FIGS. 4A and 4B, may perform a method 400 to estimate current conditions of multiple fuel cell circuits to heat or cool a fuel cell stack accordingly. The method 400 may be performed, for example, by an ECU (e.g., similar to the ECU 102 shown in and described herein with respect to FIG. 1) or a processor.

In block 402, a model of two or more fuel cell circuits may be created, and the corresponding data may be stored. The model may be created by designer(s) of the fuel cell circuits, and the corresponding data may be stored in a memory (e.g., similar to the memory 104 shown in and described herein with respect to FIG. 1) that is accessible by the ECU. The ECU may use the model of the fuel cell circuits to estimate various temperatures, pressures, and the like throughout the various components of the fuel cell circuits.

Figure 5:
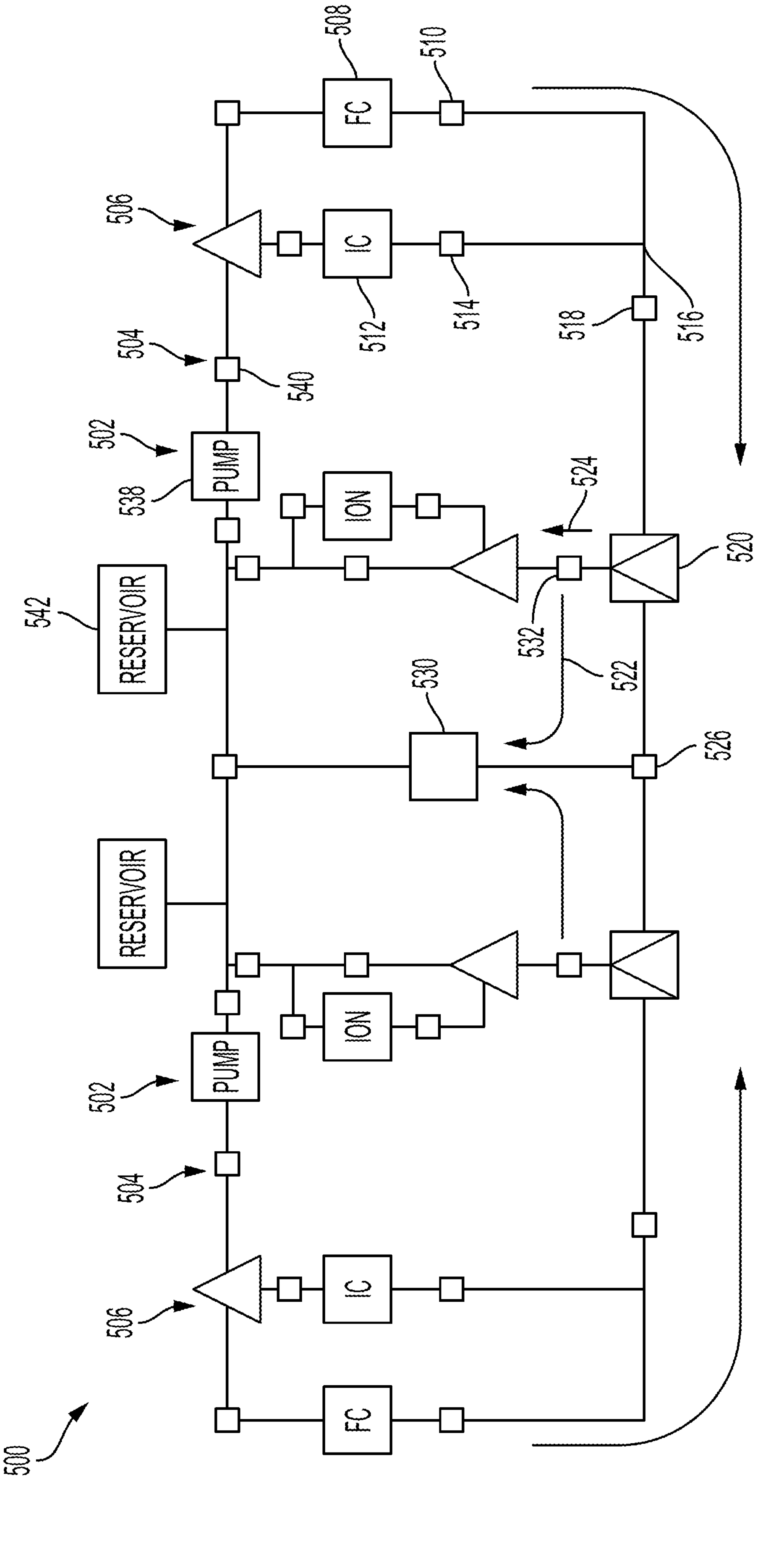
FIG. 5 is a block diagram illustrating a model of two or more fuel cell systems used by the method of FIGS. 4A and 4B to estimate the one or more parameters according to an embodiment of the present invention.

Referring briefly to FIG. 5, a model 500 of a system having two or more fuel cell circuits (such as, e.g., the system 200 shown in and described herein with respect to FIG. 2C) is shown. The model 500 may include representations of main components 502 (represented by larger squares), representations of pipes 504 (represented by smaller squares) that connect the main components 502, and representations of flow splitters 506 (represented by triangles) in which the flow of a fluid is split into two or more flows.

Referring back to FIGS. 4A and 4B, the ECU may receive a plurality of inputs in block 404. The inputs may include detected temperature values including temperatures detected by temperature sensors along with actuator control signals. The actuator control signals may correspond to commanded actuator values of the actuators (including a pump, a three-way valve, and the like).

In block 406, the ECU may determine a temperature control signal that corresponds to a desired temperature of the fluid. For example, the temperature control signal may correspond to a temperature rate of change determined by the state governor process 305. The state governor process 305 may receive a target fuel cell stack temperature. The state governor process 305 may generally dictate how fast the temperature of the fluid in the fuel cell circuits should respond to the temperature change request (i.e., how fast the temperature should increase or decrease). The state governor process 305 may output a temperature rate of change corresponding to a desired rate of temperature change of the fluid (such as at the inlet 228 or the outlet 230 of the fuel cell stack 201 shown in and described herein with respect to FIG. 2B). For example, the temperature rate of change may be measured in degrees (e.g., ° C. or ° F.) per second.

In block 408, the ECU may calculate flow resistance values of components of the fuel cell circuits, and in block 410 the ECU may calculate mass flow values of the fluid through the components of the fuel cell circuits. The flow resistance values and the mass flow values may be calculated for each component including the main components 502 and the pipes 504.

The flow resistance value for each component may be calculated using an equation similar to equation (1) below.

$$Z = \frac{Fd(\text{Length} + \text{Length}_{Add})}{4DA^2\rho} \tag{1}$$

In equation (1), Z represents the flow resistance. Fd corresponds to a Darcy friction factor of the component, which may be calculated from experimental correlations corresponding to the relevant flow regime (such as whether the flow is turbulent, laminar, etc.), which may be dictated by a corresponding Reynolds number. The Darcy friction factor may indicate an amount of friction loss through the component. Length represents a length of the component. $\text{Length}_{Add}$ corresponds to a tuning parameter which may be adjusted by the ECU during operation of the fuel cell circuits, or by designer(s) of the ECU, to increase the accuracy of the calculation for the flow resistance. The $\text{Length}_{Add}$ parameter may be adjusted until the flow resistance curve is substantially equal to an empirical curve. D represents a hydraulic diameter of the component, and A represents a cross-sectional area of the component. ρ represents density of the fluid within the component. In equation (1), Fd and ρ are variable parameters, and the remaining parameters remain constant over time.

The mass flow for a given component may be calculated using an equation similar to equation (2) shown below.

$$\dot{m}_{FF} = \frac{V_{eq}\rho_{eq}c_{eq}\frac{dT}{dt} - Q_{FC}}{\left(c(\Delta T) + \frac{1}{\rho}\left(P_{FC_{in}} - P_{FC_{out}}\right)\right)} \tag{2}$$

In equation (2), $\dot{m}_{FF}$ represents the mass flow rate of the fluid through a fuel cell stack, such as the first fuel cell stack 264 shown in and described herein with respect to FIG. 2C. $V_{eq}$ represents an equivalent volume of the fluid (including a coolant and water) and the fuel cell stack, and $V_{eq}$ is a physical property of the fluid and fuel cell stack. $\rho_{eq}$ represents an equivalent density of the fluid and the fuel cell stack. $c_{eq}$ represents an equivalent specific heat of the fluid in the fuel cell stack.

$$\frac{dT}{dt}$$

represents the temperature rate of change corresponding to a rate of increase or decrease of the temperature of the fluid at a particular location, such as at the outlet of the fuel cell stack. $Q_{FC}$ represents an amount of heat generated by the fuel cell stack. c represents the specific heat of the fluid. ΔT represents a difference between the target fuel cell inlet temperature and the target fuel cell outlet temperature. ρ represents the density of the fluid. $P_{FC_{in}}$ represents a current pressure of the fluid at the inlet of the fuel cell stack, and $P_{FC_{out}}$ represents a current pressure of the fluid at the outlet of the fuel cell stack.

Referring again to FIG. 5, due to the law of conservation of mass, the mass flow of the fluid through components connected adjacently in series will be the same. For example, a fuel cell stack 508 and a pipe 510 are connected in series. Thus, all of the fluid that flows through the fuel cell stack 508 will subsequently flow through the pipe 510 without becoming separated. In that regard, the mass flow of the fluid through the fuel cell stack 508 will be equal to the mass flow of the fluid through the pipe 510. Similarly, the mass flow of the fluid through an intercooler 512 will be equal to the mass flow of the fluid through a second pipe 514.

When the fluid from multiple components join together, such as at a junction 516, the mass flow after the junction 516 (i.e., through a subsequent component, such as a third pipe 518) will be equal to a sum of the mass flow through the components. In that regard, the mass flow of the fluid through the third pipe 518 will be equal to a sum of the mass flow through the first pipe 510 and the mass flow through the second pipe 514.

Figure 6:
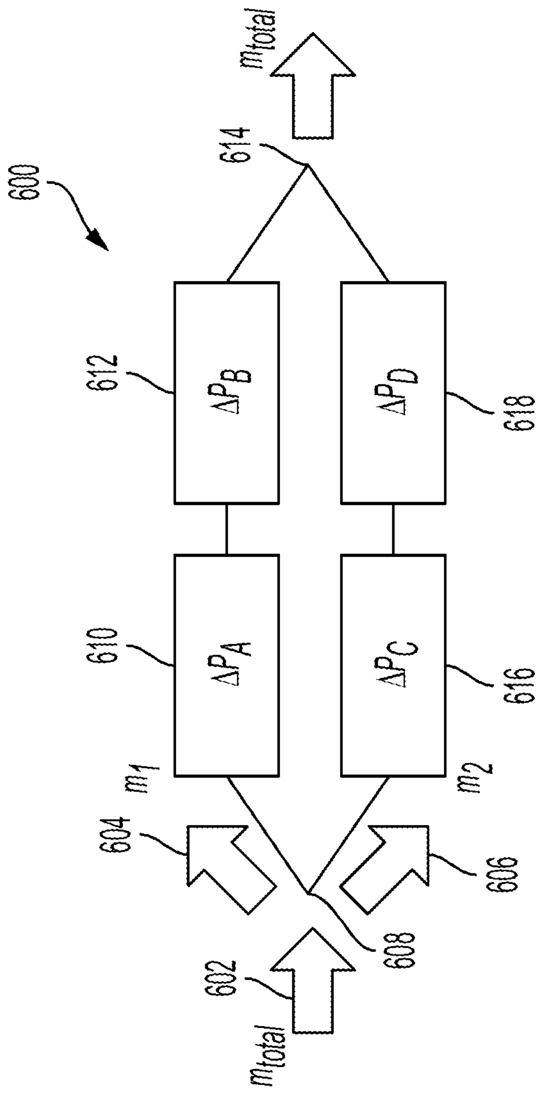
FIG. 6 is a block diagram illustrating a flow splitting element of two or more fuel cell systems according to an embodiment of the present invention.

Briefly referring to FIGS. 5 and 6, a diagram 600 illustrates a flow splitting element. The diagram 600 includes a main flow path 602 that splits into a first flow path 604 and a second flow path 606 at a flow splitter 608. The first flow path 604 may flow through a first component 610 and a second component 612 before rejoining with the second flow path 606 at a junction 614. The second flow path 606 may flow through a third component 616 and a fourth component 618 before rejoining with the first flow path 604 at the junction 614.

The diagram 600 may represent a portion of the model 500 including a flow splitter 520 (represented by the flow splitter 608), a first flow path 522 and a second flow path 524. The first flow path 522 may include a first pipe 526, and the second flow path 524 may include a second pipe 532. As shown, the model 500 of the fuel cell circuits includes multiple compound flow splits and parallel branches that include multiple components connected in series.

When solving for the mass flows and the flow resistances of the model 500, the flow resistances of one or more components may be known, and the mass flow may be known for at least one component (such as a pump 538). The mass flow (known for the one component) will remain the same for each subsequent component before reaching a flow splitter. In that regard, the mass flow of the fluid through a fourth pipe 540 will be equal to the mass flow of the fluid through the pump 538.

When the fluid reaches a flow splitter, additional calculations may be performed to calculate equivalent flow resistances of combinations of components as well as mass flows through each branch. The mass flow ($\dot{m}_{total}$) of the main flow path 602 may be known (i.e., it may be set to be equal to the mass flow through a previous series component). Likewise, flow resistances of the components 610, 612, 616, and 618 may be known.

In order to calculate equivalent flow resistances, equations (3) and (4) below may be used.

$$Z_{eq\,series} = Z_1 + Z_2 \tag{3}$$

$$Z_{eq\,parallel} = \frac{Z_4}{\left(1 + \sqrt{\frac{Z_3}{Z_4}}\right)^2} \tag{4}$$

Equation (3) may be used to calculate equivalent flow resistance for components connected in series. In that regard, an equivalent flow resistance through the first flow path 604 may be equal to a sum of the flow resistance ($Z_1$) of the first component 610 and the flow resistance ($Z_2$) of the second component 612.

Equation (4) may be used to calculate equivalent flow resistance for components connected in parallel. For example, the equivalent flow resistance through the first flow path 604 ($Z_3$) and through the second flow path 606 ($Z_4$) may be known. In that regard, an equivalent flow resistance corresponding to a flow resistance through all of the components 610, 612, 616, and 618 may be calculated using equation (4).

In order to calculate mass flow ($\dot{m}_1$) through the first flow path 604 and mass flow ($\dot{m}_2$) through the second flow path 606, equations (5) and (6) below may be used.

$$\dot{m}_1 = \frac{\dot{m}_{total}}{1 + \sqrt{\frac{Z_3}{Z_4}}} \tag{5}$$

$$\dot{m}_2 = \dot{m}_{total} - \dot{m}_1 \tag{6}$$

Equation (5) may be calculated to determine the mass flow ($\dot{m}_1$) of the fluid through the first flow path 604. $Z_3$ represents the equivalent flow resistance of the components 610 and 612 of the first flow path 604, and $Z_4$ represents the equivalent flow resistance of the components 616 and 618 of the second flow path 606. However, $Z_3$ and $Z_4$ may be unknown values at a given current timestep. In that regard, equation (5) is to be solved using $Z_3$ and $Z_4$ from a previous timestep. Because calculations are performed at relatively short intervals (such as, e.g., between 1 millisecond (ms) and 1 second, or between 5 ms and 50 ms, or about 16 ms), the equivalent flow resistances are unlikely to significantly vary between subsequent timesteps. In that regard, solving equation (5) using the equivalent flow resistances from a previous timestep is likely to provide a relatively accurate mass flow value. It may be desirable to use the equivalent flow resistances from the previous timestep due to the fact that neither the current flow resistances nor the current mass flow values may be known, and the fact that a mass flow value is necessary to solve for equivalent flow resistance (and vice versa, per equation (1)). Using the equivalent flow resistances from the previous timestep provides the advantage of allowing the ECU to dynamically solve for the flow split in any branch in real time. In some embodiments, a tool called a "real time iterative solver" may be used to solve the set of equations in real time.

Once the mass flow ($\dot{m}_1$) through the first flow path 604 is calculated using equation (5), the mass flow ($\dot{m}_2$) through the second flow path 606 may be calculated using equation (6) by subtracting the mass flow ($\dot{m}_1$) through the first flow path 604 from the total mass flow ($\dot{m}_{total}$).

After calculating the mass flow values, equations (3) through (6) may be calculated again to determine flow resistances for the current timestep. These calculations may be made using the mass flow values calculated based on the flow resistances of the previous timestep.

Referring back to FIGS. 4A, 4B, and 5, the ECU may determine a reservoir pressure of fluid within a reservoir 542 of the fuel cell circuits in block 412. The reservoir 542 may be a reservoir that contains fluid to be added to the fuel cell circuits. In some embodiments, the reservoir 542 may include a port that allows a user of a corresponding vehicle to provide the fluid, such as a coolant. The reservoir pressure may be determined based on sensor data or may be calculated by the ECU.

In block 414, the ECU may calculate pressure values for each of the components of the fuel cell circuits based on the reservoir pressure and the mass flow values calculated in block 410. In particular, a pressure drop across each component of the fuel cell circuits may be calculated using equation (7) below.

$$\Delta P = \dot{m}^2 Z \tag{7}$$

In equation (7), ΔP represents the pressure drop over a given component, such as the fourth pipe 540. $\dot{m}$ represents the mass flow of the fluid through the given component, and Z represents the flow resistance of the component. In that regard, equation (7) may be used to calculate the pressure drop over each component of the fuel cell circuits.

The pump 538 may operate as both a pressure source and a mass flow source. In some embodiments, the pump 538 may be a turbo style pump, meaning that the pump speed, the mass flow through the pump 538, and the pressure values may be coupled. Thus, a previous timestep total system pressure drop value may be used, along with a current timestep pump speed, to calculate or estimate a current timestep total mass flow (i.e., the mass flow through the pump 538).

After the reservoir pressure and the pressure drop over each component of the fuel cell circuits are known, the pressures at the inlets and outlets of each component may be calculated. This calculation may continue around the fuel cell circuits until the pressure at each node of the fuel cell circuits is determined.

In block 416, density values of the fluid through each of the components may be calculated. For example, the density values may be calculated using an equation similar to equation (1).

In block 418, specific heat values may be calculated for the fluid in each of the components. For example, the specific heat values may be calculated using an equation similar to equation (2).

In block 420, heat transfer values may be calculated for each of the components of the fuel cell circuits. The heat transfer values may correspond to an amount of heat that is added to, or subtracted from, the fluid by the given component. As similarly described herein, the intercooler 512 and the fuel cell stack 508 are the two components which add heat to the fluid. The heat transfer value ($Q_{FC}$) of the fuel cell stack 508 may be calculated or estimated using an equation, such as equation (2) above. The heat transfer value of the intercooler 512 may be calculated using a similar or other equation.

The radiator 530 and each of the pipes 504 may each remove heat from the fluid. The heat transfer value of, e.g., the radiator 530 of the fuel cell circuits may be calculated using various equations, such as equations (8) and (9) described herein. The heat transfer value of each of the pipes 504 may be estimated based on the convection properties of the pipes 504, the temperature of the fluid, and the ambient temperature outside of the pipes 504.

The ECU may calculate a desired fluid split ratio (e.g., between a bypass branch and a radiator) using an equation similar to equation (8) below.

$$Z_{FF} = \frac{(T_{pump\ in} - T_{bypass})}{(T_{rad\ out} - T_{bypass})} \tag{8}$$

In equation (8), $Z_{FF}$ represents the desired fluid split ratio (which may be calculated by a feedforward controller described herein) and corresponds to a percentage of the total fluid output by, e.g., a three-way pump that is directed through, e.g., the radiator. $T_{pump\ in}$ represents a temperature of an inlet of the pump. $T_{bypass}$ represents a temperature of the fluid directed through the bypass branch, which may be calculated at an outlet of the three-way valve that outputs fluid to the bypass branch. $T_{rad\ out}$ corresponds to a temperature of the fluid at an outlet of the radiator and may be detected using a temperature sensor, such as the second temperature sensor 226 shown in and described herein with respect to FIG. 2B.

The ECU may determine a desired valve position of the three-way valve based on the desired fluid split ratio described herein. In some embodiments, the memory of the vehicle may store a lookup table that maps desired fluid split ratios to corresponding valve positions. In these embodiments, the ECU may compare the desired fluid split ratio calculated using an equation similar to equation (8) to the lookup table and retrieve the desired valve position that corresponds to the desired fluid split ratio.

In some embodiments, the ECU may determine the desired valve position based on a sum of the desired fluid split ratio and an adjustment to the desired fluid split ratio calculated by a feedback controller described herein. In that regard, the desired valve position may be a function of the desired fluid split ratio and the adjustment to the desired fluid split ratio. The ECU may compare the results of the function to a lookup table and retrieve the desired valve position based on the comparison.

The ECU may control the three-way valve to have the desired valve position that was determined as described herein.

Moreover, the ECU may calculate a desired amount of thermal energy (i.e., heat) to be removed by the radiator of the fuel cell circuits. The ECU may calculate the desired amount of thermal energy to be removed by the radiator using an equation similar to equation (9) below.

$$Q_{rad_{total}} = V_{eq}\rho_{eq}c_{eq}\frac{dT}{dt} - Q_{FC} - Q_{IC} \tag{9}$$

In equation (9), $Q_{rad_{total}}$ represents the desired amount of thermal energy (i.e., heat) to be removed by the radiator of the fuel cell circuits. $V_{eq}$ represents an equivalent volume of the fluid (including a coolant and water) and the fuel cell stack, and is a physical property of the fluid and fuel cell stack. $\rho_{eq}$ represents an equivalent density of the fluid and the fuel cell stack. $c_{eq}$ represents an equivalent specific heat of the fluid and the fuel cell stack.

$$\frac{dT}{dt}$$

represents the temperature rate of change. $Q_{FC}$ represents an amount of heat generated by the fuel cell stack (i.e., a stack heating amount). $Q_{IC}$ represents an amount of heat generated by the intercooler (i.e., an intercooler heating amount).

In block 422, the ECU may calculate a plurality of temperature values corresponding to the components of the fuel cell circuits. For example, the ECU may calculate temperature values at the outlets of the components. Due to the conservation of energy laws, a temperature at an outlet of the first component will be equal to a temperature at an inlet of an adjacent downstream component. The temperature values may be calculated using a temperature value from a previous timestep. The temperature values may be calculated using an equation similar to equation (10) below.

$$T_{k+1} = x_{k+1} - e^{\frac{-\Delta t}{\tau}}[x_{k+1} - T_k] \tag{10}$$

In equation (10), $T_{k+1}$ represents the temperature of the fluid at an outlet of the corresponding component at a current timestep. $T_k$ represents the temperature of the fluid at a previous timestep which may have been previously calculated. $\Delta t$ represents a length of the timestep (such as, e.g., between 1 ms and 1 second, or between 5 ms and 50 ms, or about 16 ms). $\tau$ represents a time constant and is equal to $$\frac{\rho V}{\dot{m}},$$

where $\rho$ represents density of the fluid within the component, V represents volume of the fluid within the component, and m represents mass flow of the fluid through the component. $x_{k+1}$ represents an independent variable, the value of which is calculated for the current timestep.

In particular, $x_{k+1}$ may be provided as $$\left[T_1 + \frac{1}{\rho C}(P_1 - P_2) - \frac{1}{c\dot{m}}(Q)\right].$$

$T_1$ represents a temperature at an inlet of the component. ρ represents density of the fluid within the component, and c represents specific heat of the fluid within the component. $P_1$ represents a pressure of the fluid at an inlet of the component, and $P_2$ represents a pressure of the fluid at an outlet of the component. $\dot{m}$ represents mass flow of the fluid through the component. Q represents the heat transfer value of the component.

Equation (10) may be performed by the ECU at each timestep for each of the components. Because the temperature is known (from temperature sensor(s)) for at least one component of the fuel cell circuits (such as an outlet of the fuel cell stack 508), this temperature may be used as an input for solving an outlet temperature of an adjacent downstream component (such as an inlet temperature of the pipe 510). Once the outlet temperature of the adjacent downstream component is calculated, the outlet temperature may be computed or calculated for the next component, and so forth, until the outlet temperature is known for each component of the fuel cell circuits.

In block 424, the ECU may calculate a desired actuator state or position of each actuator of the fuel cell circuits. As described herein, the actuators may include a pump, a three-way valve, and the like. For example, a feedforward controller or a feedback controller of the ECU may calculate the desired actuator states or positions based on the temperature control signal and the values calculated by the state estimator process 303, such as the mass flow values, the pressure values, and the temperature values.

In block 426, the ECU may control the actuators to each have the desired actuator state or position.

In various embodiments, the control system 301 may, as part of the state estimator process 303, receive input data indicating one or more sensor values and/or one or more current actuator states or positions (or one or more commanded actuator states or positions) and may estimate one or more conditions at various locations of a fuel cell system (e.g., the system 200 shown in and described herein with respect to FIG. 2C). The one or more sensor values may include, e.g., one or more detected temperature values (e.g., as detected by the first temperature sensor 224 and/or the second temperature sensor 226 described herein). The one or more actuator states or positions may be received from the actuators themselves (e.g., the first pump 268, the second pump 282, the first valve 270, and/or the second valve 284 described herein) or via an actuator control signal.

Moreover, the control system 301 may then calculate or predict one or more temperatures at one or more respective locations of the fuel cell system where no temperature sensor may be present to estimate the one or more conditions at various locations of the fuel cell system. Furthermore, the control system 301 may calculate or predict a level of pressure of the fluid at one or more locations of the fuel cell system. Additionally, the control system 301 may calculate or predict a plurality of quantities of heat added to or subtracted from the fluid by various elements of the fuel cell system. The state estimation may be based on a modeling algorithm including calculations or estimations as described herein.

As part of the state governor process 305, the control system 301 may receive the determined state estimate(s) from the state estimator process 303 and/or one or more target state value(s) (e.g., from a user or a vehicle component). The control system 301 may determine target actuator value(s) based on the received state estimate(s) and/or the received one or more target state value(s). For example, the control system 301 may determine a target pump speed and/or a target valve position.

The control system 301 may receive a target fuel cell stack temperature value. The control system 301 may determine how fast the temperature of the fluid, e.g., in the fuel cell system may respond to a temperature change request (i.e., how fast the temperature should increase or decrease). The control system 301 may generate data corresponding to a desired or target rate of temperature change of the fluid (such as, e.g., at an outlet of the fuel cell stack). For example, the desired or target rate of temperature change may be in degrees (e.g., ° C. or ° F.) per second.

In some embodiments, the control system 301 may include a feedforward controller. The feedforward controller may receive the desired or target rate of temperature change (e.g., from the state governor process 305) along with the calculated or predicted state estimate values (e.g., from the state estimator process 303). The feedforward controller may further receive the detected temperatures from the temperature sensors. The feedforward controller may determine desired states or positions of the one or more actuators to achieve the desired rate of temperature change of the fluid of the fuel cell system. The feedforward controller may determine these desired states or positions based on the received rate of temperature change (e.g., from the state governor process 305) and the calculated or predicted state estimate values (e.g., from the state estimator process 303). The feedforward controller may output one or more feedforward control signals corresponding to the determined desired states or positions of the one or more actuators.

In some embodiments, the control system 301 may include a feedback controller. The feedback controller may also receive the desired or target rate of temperature change (e.g., from the state governor process 305) along with the calculated or predicted state estimate values (e.g., from the state estimator process 303). In some embodiments, the feedback controller may further receive the detected temperatures from the temperature sensors. The feedback controller may identify whether the actuators are achieving, e.g., the desired rate of temperature change. The feedback controller may further generate one or more feedback control signals that correspond to adjustments to the actuators to close the gap between a measured rate of temperature change and the desired rate of temperature change (i.e., the feedback control signals may be related to adjustments to states or positions of the one or more actuators including, e.g., adjustments related to pump speed, valve position, or the like).

In some embodiments, an observer module, apparatus, or circuitry may operate as the feedback controller for a common cooling system (e.g., including the one or more radiators 210 described herein). In that regard, with a brief reference to FIG. 2B, the observer module may determine a difference between a detected temperature at the fluid outlet 234 of the one or more radiators 210 and an estimated temperature at the fluid outlet 234 (e.g., as may be determined by the state estimator process 303). The observer module may then adjust the values determined by the control system 301 as part of the state estimator process 303 to cause the estimated temperature to be closer in value to the detected temperature.

The control system 301 may then (as part of the target command determination processes 307A and 307B) receive the target actuator value(s) (as well as, in some embodiments, the feedforward control signals and/or the feedback control signals) and generate one or more actuator control signals based on the received target value(s) (as well as, in some embodiments, the combination of the feedforward control signals and/or the feedback control signals). The generated one or more actuator control signals may include a pump control signal corresponding to a target pump speed (307A) and/or a valve control signal corresponding to a target valve position (307B). One or more of the actuator control signals may be transmitted to each of the actuators (as part of the part controller processes 309A and 309B). For example, the actuator control signals may include a first signal that controls a valve position and a second signal that controls a pump speed. In some embodiments, the control system 301 (as part of the part controller processes 309A and 309B) may generate the actuator control signals for a valve and/or a pump by adding the feedforward control signals and the feedback control signals. In some embodiments, the fan speed (e.g., of the fan 218 shown in and described herein with respect to FIG. 2B) may be related to an amount of heat extracted at a radiator—further contributing to the adjustment of the pump speed and/or the valve position.

In some embodiments, the control system 301 may calculate a desired mass flow rate of the fluid that corresponds to the desired rate of temperature change. The control system 301 may calculate the desired mass flow rate based on the desired rate of temperature change (e.g., as determined by the state governor process 305) as well as the estimated or calculated values (e.g., as determined by the state estimator process 303). Moreover, the desired mass flow rate may be determined in an effort to, e.g., prevent a back-flow of the fluid towards a fuel cell system as described herein.

In various embodiments, the desired or target pump speed (e.g., corresponding to the desired mass flow rate of the fluid) may be calculated using at least equations (11) and (12) shown below.

$$q F\dot{C}_{cm} = \frac{V_{eq}\rho_{eq}C_{eq}\frac{dT}{dt} - Q_{FC}}{\left(c(\Delta T) + \frac{1}{\rho}\left(P_{FC_{in}} - P_{FC_{out}}\right)\right)}\frac{1{,}000*60}{\rho} \tag{11}$$

In equation (11), $qF\dot{C}_{cm}$ represents the desired (volumetric) flow rate of the fluid through a fuel cell stack, such as the first fuel cell stack 264 shown in and described herein with respect to FIG. 2C. $V_{eq}$ represents an equivalent volume of the fluid (including a coolant and water) and the fuel cell stack and is a physical property of the fluid and the fuel cell stack. $\rho_{eq}$ represents an equivalent density of the fluid and the fuel cell stack and may be determined by the state estimator process 303. $c_{eq}$ represents an equivalent specific heat of the fluid in the fuel cell stack and may also be determined by the state estimator process 303.

$$\frac{dT}{dt}$$

represents the temperature rate of change calculated. $Q_{FC}$ represents an amount of heat generated by the fuel cell stack and may be determined by the state estimator process 303. c represents the specific heat of the fluid and may be determined by the state estimator process 303. $\Delta T$ represents a difference between the target fuel cell inlet temperature and the target fuel cell outlet temperature ($T_{FC_{in\ cmd}} - T_{FC_{cmd}}$) and may be received from the state governor process 305 or from the state estimator process 303. $\rho$ represents the density of the fluid and may be determined by the state estimator process 303. $P_{FC_{in}}$ represents a current pressure of the fluid at an inlet of the fuel cell stack, and $P_{FC_{out}}$ represents a current pressure of the fluid at an outlet of the fuel cell stack, both of which may be determined by the state estimator process 303.

$$\frac{1{,}000*60}{\rho}$$

represents a conversion factor from kg/s (mass flow rate) to 1/min (volumetric flow rate).

$$q\dot{W}P_{cm} = qF\dot{C}_{cm}\left(1 + \sqrt{\frac{Z_{FC}}{Z_{IC}}}\right) \tag{12}$$

In equation (12), $q\dot{W}P_{cm}$ represents the desired (volumetric) flow rate of the fluid through a pump, such as the first pump 268 shown in and described herein with respect to FIG. 2C. $qF\dot{C}_{cm}$ represents the desired (volumetric) flow rate of the fluid through the fuel cell stack determined based on equation (11). $Z_{FC}$ and $Z_{IC}$ represent, respectively, the fuel cell stack path and intercooler path flow resistance values related to the fuel cell stack path and the intercooler path shown in FIG. 2C having, respectively, the first fuel cell stack 264 and the first intercooler 266 thereon. Then, the desired (target) pump speed for a pump ($\omega WP_{cm}$) may be determined based on an estimated pressure differential or drop across a pump ($WP_{dP\ est}$), the desired flow rate of the fluid through a pump ($q\dot{W}P_{cm}$), an estimated flow rate of the fluid through a pump ($q\dot{W}P_{est}$), and a temperature of the fluid at a pump ($T_{WP}$). That is, the desired (target) water pump speed may be determined as a function (e.g., a predetermined function as determined or designed by a designer or an engineer of the fuel cell circuits or systems) of an estimated pressure differential or drop across a pump ($WP_{dP\ est}$), the desired flow rate of the fluid through a pump ($q\dot{W}P_{cm}$), an estimated flow rate of the fluid through a pump ($q\dot{W}P_{est}$), and a temperature of the fluid at a pump ($T_{WP}$).

Figure 7A:
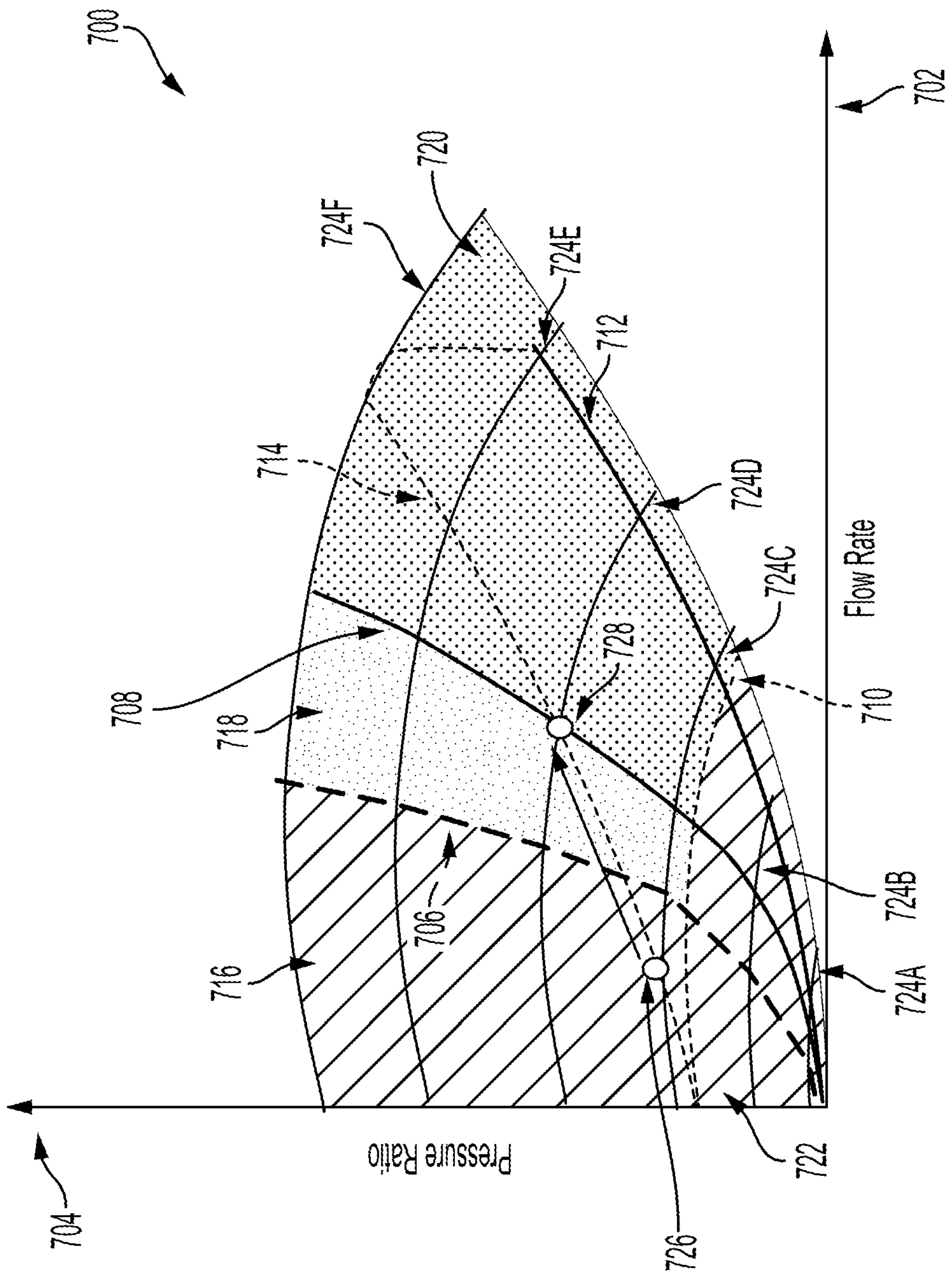
FIGS. 7A and 7B are graphical illustrations of various operating conditions of a system for cooling two or more fuel cell systems on a vehicle according to an embodiment of the present invention.

FIG. 7A is a graphical illustration (a graph 700 having a first axis 702 corresponding to fluid flow rate and a second axis 704 corresponding to fluid pressure differential or drop ratio) of various operating conditions of a system for cooling two or more fuel cell systems on a vehicle. The graph 700 as shown in FIG. 7A may correspond to an operating condition related to a first fuel cell system of the two or more fuel cell systems wherein a valve within a second fuel cell system may be commanded to be open (thus causing an impact on the operating conditions of the first fuel cell system). The graph 700 includes a plurality of pump speed curves 724A-724F corresponding to a plurality of respective operating conditions at a plurality of constant pump speeds (e.g., a first pump speed through a sixth pump speed, respectively).

As shown, a first curve 712 indicates a curve of operating points of a fuel cell system—e.g., the first fuel cell system—(i.e., of a pressure differential or drop ratio vs. a flow rate for a pump) when a valve in an added (e.g., the second) fuel cell system is closed. That is, the operation of the first fuel cell system would not be meaningfully impacted by the added fuel system. A second curve 714 indicates a curve of operating points when the valve in the added (e.g., the second) fuel cell system is open (wherein the flow path of a fluid may depend on the valve position). A surge line 706 indicates a threshold below which a surge event (wherein, e.g., the flow of a fluid may oscillate between positive and negative directions uncontrollably) may occur (e.g., within a surge area 716 as shown, bounded by the second axis 704, the surge line 706, and the sixth pump speed curve 724F). A controllability line 708 indicates a margin of error (e.g., 5%) to ensure that the surge event is prevented (e.g., within a controllability margin area 718 as shown, bounded by the surge line 706, the controllability line 708, and the sixth pump speed curve 724F). Thus, it would be desirable for a fuel cell system (e.g., the first fuel cell system) to operate at at least the threshold indicated by the controllability line 708 (e.g., within a desired operation area 720).

As an example, a first operating point 726 may indicate an operating point corresponding to a pump speed (e.g., corresponding to the third pump speed curve 724C) which, without the added (second) fuel cell system (e.g., on the first curve 712), may have resulted in an operating point outside of the surge area 716 and the controllability margin area 718 (that is, within the desired operation area 720—near the intersection of the first curve 712 and the third pump speed curve 724C). However, with the added (second) fuel cell system, the first operating point 726, at the same pump speed, is shown as being subject to a higher pressure differential and/or a reduced flow rate (due to the added (second) fuel cell system and the fluid being received from the added fuel cell system in an opposing direction than the direction of the fluid flow from the first fuel cell system—i.e., from the pump within the first fuel cell system). Thus, it would be desirable that the operating point be shifted to a first adjusted operating point 728 on the second curve 714 to a point corresponding to a higher pump speed (e.g., on the fourth pump speed curve 724D) at which the first adjusted operating point 728 would now be outside of the surge area 716 and the controllability margin area 718 (i.e., near the intersection of the second curve 714 and the fourth pump speed curve 724D). The graph 700 also includes a minimum pump operation line 710 and a potential back-flow area 722 that are described further herein with respect to FIG. 7B.

Figure 7B:
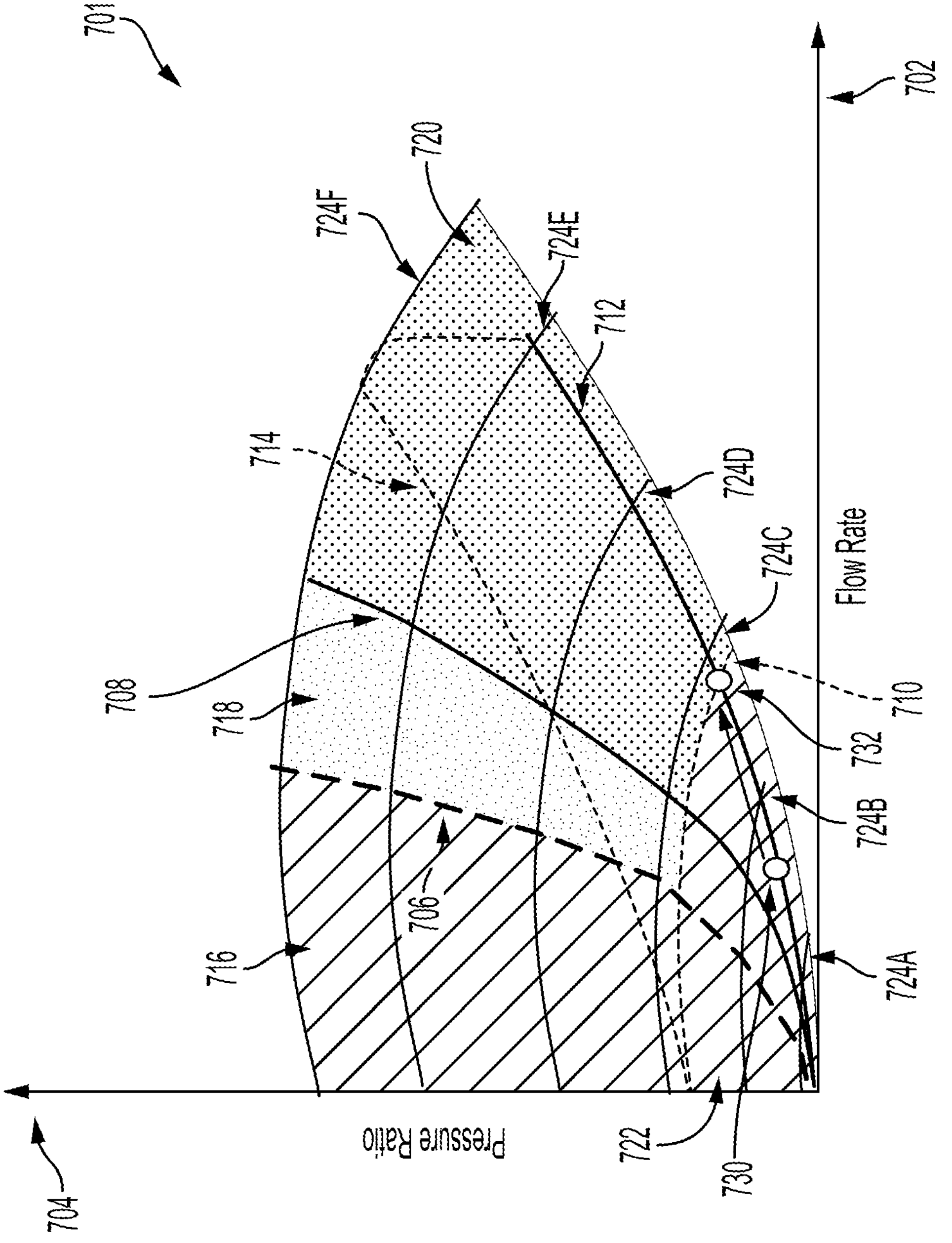

FIG. 7B is another graphical illustration (a second graph 701 similar to the graph 700 shown in FIG. 7A) of various operating conditions of a system for cooling two or more fuel cell systems on a vehicle. For further safeguard than what is shown in FIG. 7A, the minimum pump operation line 710 indicating, e.g., the minimum pump speed to prevent a potential back-flow of the fluid if the valve within the added (second) fuel cell system were to malfunction and stay open even when commanded to be closed (and/or undetected by any sensor or detected incorrectly as not being open). Thus, it would be desirable to account for, e.g., the potential pressure differential or drop ratio over the pump within the first fuel cell system being different than without the added (second) fuel cell system and control the pump within the first fuel cell system to operate beyond the minimum pump operation line 710 (i.e., outside of the potential back-flow area 722) in order to prevent the potential back-flow of the fluid. Accordingly, it would be desirable for the first fuel cell system to operate outside of the surge area 716 and the potential back-flow area 722 (which may overlap in part) as well as the controllability margin area 718 and operate within the desired operation area 720.

As an example, a second operating point 730 may indicate an operating point corresponding to a pressure differential and/or a flow rate which, without the added (second) fuel cell system, may have resulted in an operating point outside of the surge area 716 and the controllability margin area 718. However, with the added (second) fuel cell system, the operating point may need to be shifted to a second adjusted operating point 732 that may prevent the potential back-flow of the fluid—i.e., at which the minimum level of pressure differential is accounted for and the minimum level of pump speed may be met to ensure that the potential back-flow of the fluid is prevented even in the case, e.g., when the valve within the added (second) fuel cell system may be stuck fully open while the pump within the added (second) fuel cell system may be operating at the maximum pump speed. The system 300 (including the control system 301) shown in and described herein with respect to FIGS. 3A and 3B may control the one or more actuators (e.g., a pump and/or a valve) based on the desired values indicated by such operating point(s) within the desired operation area 720.

Figure 8:
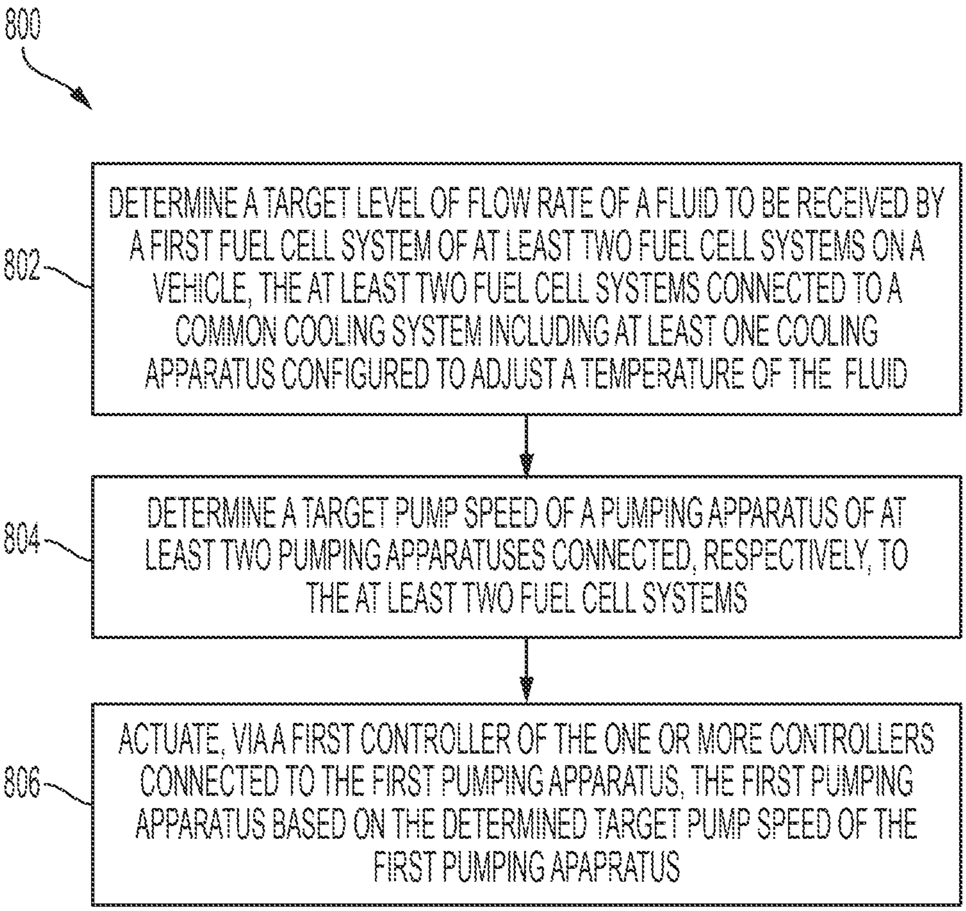
FIG. 8 is a flowchart of a method for cooling two or more fuel cell systems on a vehicle according to an embodiment of the present invention.

FIG. 8 is a flowchart of a method 800 for cooling two or more fuel cell systems, e.g., on a vehicle. The method 800, at least in part, may be implemented via a plurality of instructions (e.g., a software program) stored on a memory (similar to the memory 104 described herein with respect to FIG. 1) and accessed and processed by a processor (e.g., on or within the ECU 102 described herein with respect to FIG. 1) to perform the various steps of the method 800.

The method 800 may include determining, by an electronic control unit (ECU), a target flow rate of a fluid to be received by a first fuel cell system of at least two fuel cell systems on a vehicle. The at least two fuel cell systems may be connected to a common cooling system including at least one cooling apparatus configured to adjust a temperature of the fluid (step 802).

The method 800 may also include determining, by the ECU, a target pump speed of a first pumping apparatus of at least two pumping apparatuses connected, respectively, to the at least two fuel cell systems based on the determined target flow rate of the fluid to be received by the first fuel cell system (step 804).

The method 800 may further include actuating, by the ECU and via a first controller of one or more controllers connected to the first pumping apparatus, the first pumping apparatus based on the determined target pump speed of the first pumping apparatus (step 806).

In some embodiments, determining the target flow rate of the fluid may include determining a minimum flow rate of the fluid to prevent a back-flow of the fluid to the first fuel cell system from at least a second fuel cell system of the at least two fuel cell systems. In some examples, determining the minimum flow rate of the fluid to prevent the back-flow of the fluid may be based on at least one of (i) sensor data indicating one or more detected values of one or more respective parameters or (ii) estimated or calculated data corresponding to one or more estimated or calculated values of the one or more respective parameters based on modeled data. Moreover, determining the target flow rate of the fluid may include obtaining a predetermined error amount of flow rate of the fluid and updating the target flow rate of the fluid based on the minimum flow rate of the fluid and the predetermined error amount of flow rate of the fluid.

In some embodiments, the method 800 may also include determining, by the ECU, a target level of opening of a first fluid flow control apparatus of at least two fluid flow control apparatuses connected to the first fuel cell system. The at least two fluid flow control apparatuses may be connected, respectively, to the at least two fuel cell systems and to one or more controllers. Each of the at least two fluid flow control apparatuses may be configured to control a flow of the fluid from the respective fuel cell system to the common cooling system. The method 800 may also include actuating, by the ECU and via a first controller of the one or more controllers, the first fluid flow control apparatus based on the determined target level of opening of the first fluid flow control apparatus.

In some embodiments, the method 800 may further include determining an expected (i.e., estimated) pressure drop value across the first pumping apparatus, an expected (i.e., estimated) flow rate of the fluid at the first pumping apparatus, and a temperature of the fluid at the first pumping apparatus. Determining the target pump speed of the first pumping apparatus may be further based on the determined expected pressure drop value across the first pumping apparatus, the determined expected flow rate of the fluid at the first pumping apparatus, and the determined temperature of the fluid at the first pumping apparatus. In some examples, determining the target pump speed of the first pumping apparatus based on the determined target flow rate of the fluid to be received by the first fuel cell system and further based on the determined expected pressure drop value across the first pumping apparatus, the determined expected flow rate of the fluid at the first pumping apparatus, and the determined temperature of the fluid at the first pumping apparatus may include determining the target pump speed of the first pumping apparatus based on a predetermined function (e.g., as designed by a designer or an engineer of the fuel cell systems) of the determined target flow rate of the fluid to be received by the first fuel cell system, the determined expected pressure drop value across the first pumping apparatus, the determined expected flow rate of the fluid at the first pumping apparatus, and the determined temperature of the fluid at the first pumping apparatus.

Where used throughout the specification and the claims, “at least one of A or B” includes “A” only, “B” only, or “A and B.” Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. A system for cooling two or more fuel cell systems on a vehicle, the system comprising:

at least two fuel cell systems connected to a common cooling system, each of the at least two fuel cell systems including a fuel cell stack having a plurality of fuel cells and being configured to receive a fluid, the common cooling system including at least one cooling apparatus configured to adjust a temperature of the fluid;

at least two pumping apparatuses connected, respectively, to the at least two fuel cell systems, each of the at least two pumping apparatuses being configured to adjust a flow rate of the fluid to a respective fuel cell system of the at least two fuel cell systems based on a target pump speed; and a processor connected to one or more controllers that are connected to the at least two pumping apparatuses, the processor being configured to:

determine a target flow rate of the fluid to be received by a first fuel cell system of the at least two fuel cell systems, determine the target pump speed of a first pumping apparatus of the at least two pumping apparatuses connected to the first fuel cell system based on the determined target flow rate of the fluid to be received by the first fuel cell system, and actuate the first pumping apparatus via a first controller of the one or more controllers connected to the first pumping apparatus based on the determined target pump speed of the first pumping apparatus.

2. The system of claim 1, wherein the determination of the target flow rate of the fluid includes determination of a minimum flow rate of the fluid to prevent a back-flow of the fluid to the first fuel cell system from at least a second fuel cell system of the at least two fuel cell systems.

3. The system of claim 2, wherein the determination of the minimum flow rate of the fluid to prevent the back-flow of the fluid is based on at least one of (i) sensor data indicating one or more detected values of one or more respective parameters or (ii) estimated or calculated data corresponding to one or more estimated or calculated values of the one or more respective parameters based on modeled data.

4. The system of claim 2, wherein the determination of the target flow rate of the fluid includes:

obtaining of a predetermined error amount of flow rate of the fluid, and update of the target flow rate of the fluid based on the minimum flow rate of the fluid and the predetermined error amount of flow rate of the fluid.

5. The system of claim 1, further comprising:

at least two fluid flow control apparatuses connected, respectively, to the at least two fuel cell systems and to the one or more controllers, each of the at least two fluid flow control apparatuses being configured to control a flow of the fluid from the respective fuel cell system to the common cooling system; and wherein the processor is further configured to:

determine a target level of opening of a first fluid flow control apparatus of the at least two fluid flow control apparatuses connected to the first fuel cell system, and actuate the first fluid flow control apparatus via the first controller based on the determined target level of opening of the first fluid flow control apparatus.

6. The system of claim 1, wherein the processor is further configured to determine an expected pressure drop value across the first pumping apparatus, wherein the determination of the target pump speed of the first pumping apparatus is further based on the determined expected pressure drop value across the first pumping apparatus.

7. The system of claim 1, wherein the determination of the target pump speed of the first pumping apparatus includes comparing the determined target pump speed of the first pumping apparatus to a predetermined minimum pump speed and verifying that the determined target pump speed of the first pumping apparatus is equal to or greater than the predetermined minimum pump speed.

8. The system of claim 1, wherein the processor is further configured to receive a target fuel cell stack temperature value for the first fuel cell system and determine a desired rate of temperature change of the fluid based on the received target fuel cell stack temperature value.

9. The system of claim 1, wherein the processor further includes a feedforward controller configured to receive a desired rate of temperature change and state estimate values, and determine desired states or positions of one or more actuators to achieve the desired rate of temperature change based on the received state estimate values.

10. A method for cooling two or more fuel cell systems on a vehicle, the method comprising:

determining, by a processor connected to one or more controllers that are connected to at least two pumping apparatuses, a target flow rate of a fluid to be received by a first fuel cell system of at least two fuel cell systems on the vehicle, the at least two fuel cell systems being connected to a common cooling system, each of the at least two fuel cell systems including a fuel cell stack having a plurality of fuel cells and being configured to receive the fluid, the common cooling system including at least one cooling apparatus configured to adjust a temperature of the fluid, the at least two pumping apparatuses being connected, respectively, to the at least two fuel cell systems, and each of the at least two pumping apparatuses being configured to adjust a flow rate of the fluid to a respective fuel cell system of the at least two fuel cell systems based on a target pump speed;

determining, by the processor, the target pump speed of a first pumping apparatus of the at least two pumping apparatuses connected to the first fuel cell system based on the determined target flow rate of the fluid to be received by the first fuel cell system; and actuating, by the processor via a first controller of the one or more controllers connected to the first pumping apparatus, the first pumping apparatus based on the determined target pump speed of the first pumping apparatus.

11. The method of claim 10, wherein determining the target flow rate of the fluid includes determining a minimum flow rate of the fluid to prevent a back-flow of the fluid to the first fuel cell system from at least a second fuel cell system of the at least two fuel cell systems.

12. The method of claim 11, wherein determining the minimum flow rate of the fluid to prevent the back-flow of the fluid is based on at least one of (i) sensor data indicating one or more detected values of one or more respective parameters or (ii) estimated or calculated data corresponding to one or more estimated or calculated values of the one or more respective parameters based on modeled data.

13. The method of claim 10, further comprising:

receiving, by the processor, one or more sensor values and one or more actuator states or positions; and estimating, by the processor, one or more conditions at one or more locations of the at least two fuel cell systems based on the received sensor values and actuator states or positions using a modeling algorithm.

14. The method of claim 13, wherein estimating the one or more conditions includes at least one of:

calculating or predicting one or more temperatures at one or more respective locations of the at least two fuel cell systems where no temperature sensor is present;

calculating or predicting a pressure level of the fluid at one or more locations of the at least two fuel cell systems; or calculating or predicting a plurality of quantities of heat added to or subtracted from the fluid by various elements of the at least two fuel cell systems.

15. The method of claim 14, wherein the modeling algorithm is based on a model of the at least two fuel cell systems that includes representations of main components, pipes connecting the main components, and flow splitters at which a flow of the fluid is split into two or more flows.

16. A vehicle having a system for cooling two or more fuel cell systems, the vehicle comprising:

at least two fuel cell systems connected to a common cooling system, each of the at least two fuel cell systems including a fuel cell stack having a plurality of fuel cells and being configured to receive a fluid, the common cooling system including at least one cooling apparatus configured to adjust a temperature of the fluid;

at least two pumping apparatuses connected, respectively, to the at least two fuel cell systems, each of the at least two pumping apparatuses being configured to adjust a flow rate of the fluid to a respective fuel cell system of the at least two fuel cell systems based on a target pump speed; and a processor connected to one or more controllers that are connected to the at least two pumping apparatuses, the processor being configured to:

determine a target flow rate of the fluid to be received by a first fuel cell system of the at least two fuel cell systems;

determine the target pump speed of a first pumping apparatus of the at least two pumping apparatuses connected to the first fuel cell system based on the determined target flow rate; and actuate the first pumping apparatus via a first controller of the one or more controllers based on the determined target pump speed.

17. The vehicle of claim 16, wherein the processor is further configured to execute a state estimator process that: receives one or more sensor values and one or more actuator states or positions, and estimates one or more conditions at one or more locations of the at least two fuel cell systems based on the received sensor values and actuator states or positions using a modeling algorithm.

18. The vehicle of claim 17, wherein estimating the one or more conditions includes calculating or predicting one or more temperatures at one or more respective locations of the at least two fuel cell systems where no temperature sensor is present.

19. The vehicle of claim 16, wherein the determination of the target flow rate of the fluid includes determination of a minimum flow rate of the fluid to prevent a back-flow of the fluid to the first fuel cell system from at least a second fuel cell system of the at least two fuel cell systems.

* * * * *